(12) United States Patent
Okuyama et al.

(10) Patent No.: US 8,675,090 B2
(45) Date of Patent: Mar. 18, 2014

(54) IMAGE GENERATING APPARATUS, IMAGE GENERATING METHOD, AND RECORDING MEDIUM

(75) Inventors: Tetsuro Okuyama, Osaka (JP); Akio Nishimura, Osaka (JP)

(73) Assignee: Panasonic Corporation, Osaka (JP)

( * ) Notice: Subject to any disclaimer, the term of this patent is extended or adjusted under 35 U.S.C. 154(b) by 172 days.

(21) Appl. No.: 13/325,109

(22) Filed: Dec. 14, 2011

(65) Prior Publication Data

US 2012/0154643 A1 Jun. 21, 2012

(30) Foreign Application Priority Data

Dec. 15, 2010 (JP) ................................. 2010-279946

(51) Int. Cl.
*H04N 5/228* (2006.01)
*H04N 7/18* (2006.01)
*G06K 9/32* (2006.01)

(52) U.S. Cl.
USPC ........................ 348/222.1; 348/143; 382/295

(58) Field of Classification Search
USPC ......... 348/143, 222.1; 382/286, 295; 345/657
See application file for complete search history.

(56) References Cited

U.S. PATENT DOCUMENTS

| 7,327,442 | B1* | 2/2008 | Fear et al. ..................... 356/4.08 |
| 7,414,647 | B2* | 8/2008 | Kakou et al. .................. 348/143 |
| 2008/0166017 | A1* | 7/2008 | Ito et al. ........................ 382/103 |
| 2010/0103266 | A1* | 4/2010 | Merkel et al. ................. 348/155 |
| 2010/0119172 | A1* | 5/2010 | Yu et al. ........................ 382/256 |
| 2010/0201820 | A1* | 8/2010 | Lopota et al. ................. 348/152 |
| 2011/0103647 | A1* | 5/2011 | Leopold et al. ............... 382/103 |

OTHER PUBLICATIONS

Dalal, N. et al., "Histograms of oriented gradients for human detection", Computer Vision and Pattern Recognition, Jun. 2005, IEEE Computer Society Conference, pp. 886-893.

Tatsuo Sato, et al., "Extension Method for Omni-directional Camera", Report by OITA-AIST Joint Research Center, Industrial Technology Div., vol. 2002 pp. 9-11, 2002, with English translation.

* cited by examiner

*Primary Examiner* — Tuan Ho
*Assistant Examiner* — Shahbaz Nazrul
(74) *Attorney, Agent, or Firm* — Wenderoth, Lind & Ponack, L.L.P.

(57) ABSTRACT

An image generating apparatus which generates a second image that is an image converted from a first image captured by an imaging apparatus placed to be oriented downward at an angle of depression with respect to a horizontal direction includes: a specifying unit which specifies a straight line included in the first image and passing through an intersection between an imaging plane and a vertical vector; and an image extension processing unit which generates the second image by sampling pixels of the first image along the specified straight line.

13 Claims, 19 Drawing Sheets

IMAGE GENERATING APPARATUS, IMAGE GENERATING METHOD, AND RECORDING MEDIUM

CROSS REFERENCE TO RELATED APPLICATIONS

The present application is based on and claims priority of Japanese Patent Application No. 2010-279946 filed on Dec. 15, 2010. The entire disclosure of the above-identified application, including the specification, drawings and claims is incorporated herein by reference in its entirety.

BACKGROUND OF THE INVENTION (1) Field of the Invention

The present invention relates to perspective distortion correction performed on an image captured by a monitoring apparatus and so on.

(2) Description of the Related Art

Conventionally, solid-state imaging elements such as a charge coupled device (CCD) and a complementary metal oxide semiconductor (CMOS) have been used for monitoring apparatuses. Widely used as such monitoring apparatuses is a monitoring apparatus which performs image processing on a captured image so as to detect an object, particularly, a person. As a method of detecting a person in the image, a method using a pattern recognition technique based on statistical learning as disclosed in Non-Patent Reference 1 is generally used (Dalai, N. and Triggs, B., "Histograms of oriented gradients for human detection", Computer Vision and Pattern Recognition, 2005. IEEE Computer Society Conference, pages: 886-893).

In this method, each of the following techniques is used. A feature selection technique is used for extracting, from the captured image, a feature quantity used for identification. An identifier construction technique is used for constructing an identifier which takes the selected feature quantity as input and determines whether or not the selected feature quantity represents the target. A technique to determine, using the constructed identifier, whether or not there is a person in a partial area in the imaging area is used.

A monitoring apparatus using a normal lens is provided at a constant angle of depression in a high position in a ceiling and so on. Thus, in the image captured from above, a significant perspective distortion is caused as a result of projecting a three-dimensional subject onto a two-dimensional imaging element. This causes a difference in tilt of a person in an image portion, even if it is the image portion of the same person standing upright, depending on whether the image portion of the person is located in a center of the image or at an end portion. In other words, this causes a difference in direction of the person (a direction from a foot to a head, and so on).

However, the identifier constructed for human detection is only capable of detecting a person having a particular tilt in the image. Therefore, to automatically detect all people in the image captured by the monitoring apparatus, a method generally used is to generate identifiers corresponding to tilts of all the people that can be captured in the image and perform judgment processing the number of times equivalent to the number of identifiers.

In addition, in the monitoring apparatus, to respond to the needs for monitoring an entire range with one camera, an omnidirectional imaging apparatus using a fisheye lens, an omnidirectional mirror, and so on has come to be used more often than before. In the case of the monitoring apparatus using the omnidirectional imaging apparatus, a special circular image is captured, so that the detection is often performed on an image generated by converting the captured image.

For example, in Non-Patent Reference 2 (Tatsuo Sato, Kazuhiro Goto, "Extension Method for Omni-directional Camera", OITA-AIST Joint Research Center, Industrial Technology Div., Vol: 2002, pages 9 to 11), panoramic extension is performed on an omnidirectional image which maintains an aspect ratio of an object, based on a center of the circular image. As a result, this equalizes the directions of the upper and lower parts of the person in the extended image, thus allowing the detection to be performed using the same processing as the processing for an image captured with a normal lens.

SUMMARY OF THE INVENTION

However, in the case of using more identifiers, there is a problem that such human detection processing requires more storage area and processing time.

In addition, even in the monitoring apparatus using a normal lens, a wide-angle lens (with a view angle of approximately 90 degrees) is often used so as to secure a monitoring range as wide as possible. However, since perspective distortion is more significant in the monitoring apparatus using the wide-angle lens than in the monitoring apparatus using the normal lens, it is necessary to provide more detectors when it is intended to detect all the people in the captured image.

Furthermore, the image conversion performed on the omnidirectional image has a problem that such image conversion cannot be used for the imaging apparatus using the normal lens because Non-Patent Reference 2 is based on the premise that the input image is an omnidirectional image.

The present invention is to solve the conventional problem described above, and it is an object of the present invention to provide an imaging apparatus which performs image conversion processing appropriate for object detection by equalizing tilts of the people in the image.

To solve the conventional problem as described above, an image generating apparatus according to an aspect of the present invention is an image generating apparatus which generates a second image that is an image converted from a first image captured by an imaging apparatus placed to be oriented downward at an angle of depression with respect to a horizontal direction, and the image generating apparatus includes: a specifying unit which specifies a straight line included in the first image and passing through an intersection between an imaging plane and a vertical vector having a start point at the imaging apparatus; and an image extension processing unit which generates the second image by sampling pixels of the first image along the specified straight line.

With this configuration, it is possible to generate an image in which tilts of people (objects) captured in the image, which derive from the perspective distortion and the method of capturing the omnidirectional image, are integrated through image conversion.

With the imaging apparatus according to an implementation of the present invention, since the tilts of the people (objects) standing upright with respect to the ground are unified in the output image, object detection, particularly, human detection requires only one feature quantity.

In addition, the optical system can output an appropriate corrected image even when the image is captured using, not limited to a wide-angle lens, a fisheye lens or an omnidirectional mirror.

It is possible to specify an appropriate direction (see a direction 4bd) by preventing an inappropriate direction (see a direction 9xd) from being specified despite an optical axis of the imaging apparatus (see direction 804L in FIG. 8) being directed diagonally downward (see description in FIG. 8 and so on).

This further allows simplifying the configuration by preventing complexity of configuration (see human detector 100d), despite the optical axis being directed diagonally downward.

BRIEF DESCRIPTION OF THE DRAWINGS

These and other objects, advantages and features of the invention will become apparent from the following description thereof taken in conjunction with the accompanying drawings that illustrate a specific embodiment of the present invention. In the Drawings.

DESCRIPTION OF THE PREFERRED EMBODIMENTS

Figure 1:
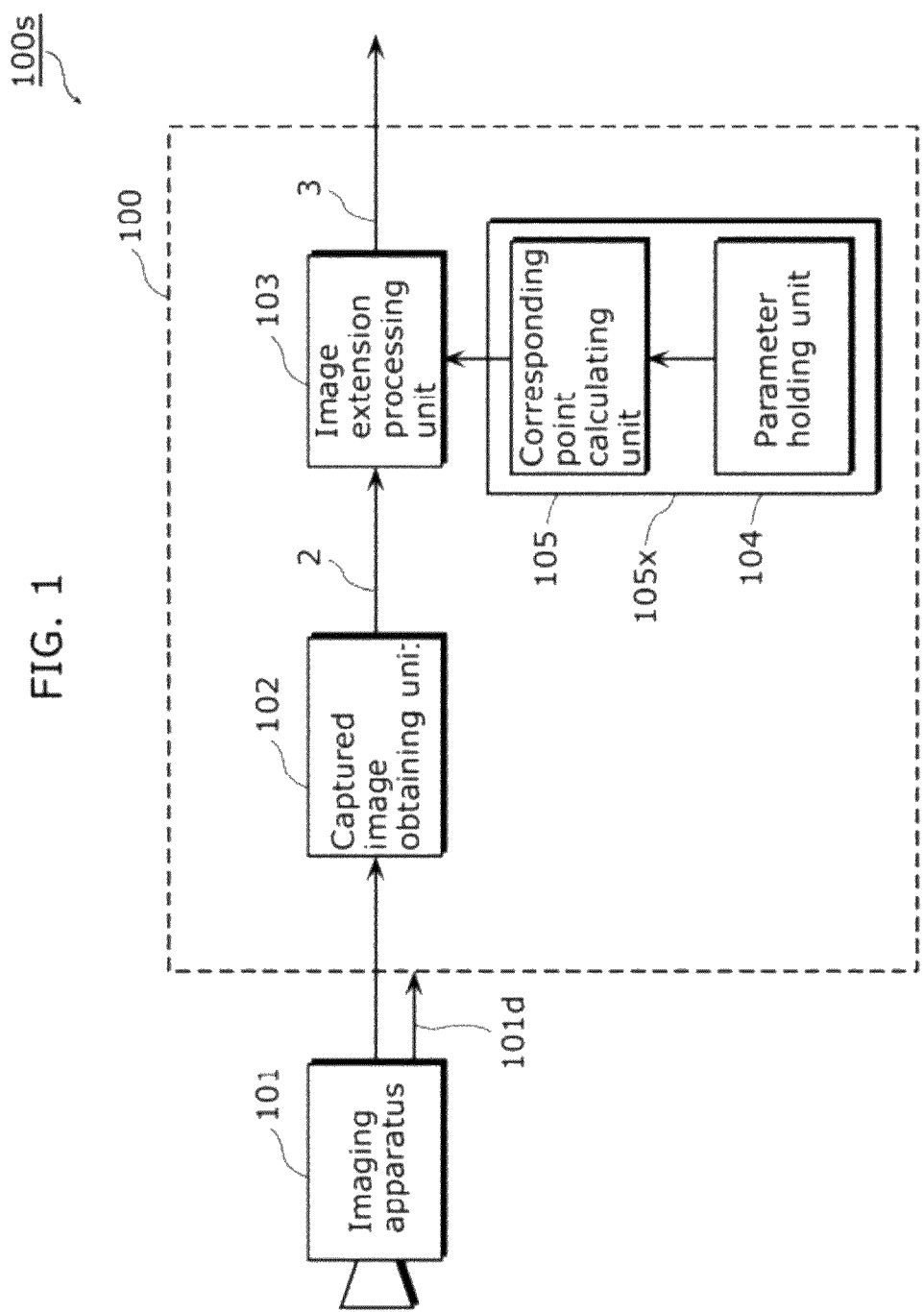
FIG. 1 is a block diagram showing a configuration of an imaging apparatus according to a first embodiment.

Hereinafter, embodiments of the present invention will be described with reference to the drawings. Note that each of the embodiments described below shows a specific example of a preferred implementation of the present invention. Any constituent element, connection mode of the constituent elements, steps, and order of steps are mere examples, and these are not intended to limit the present invention. The present invention is limited only by What is claimed is. Accordingly, of the constituent elements in the embodiments below, some constituent elements that are not described in independent claims representing highest concepts of the present invention are described as not essential but as components of a more preferable embodiment.

An image generating apparatus according to the embodiment is an image generating apparatus (image conversion apparatus, computer, image processing apparatus, image conversion processing unit) 100 which generates a second image (extended image) 3 which is generated by performing image conversion on a first image (captured image) 2 that is captured by an imaging apparatus 101 placed to be oriented downward at an angle of depression (angle 201) with respect to a horizontal direction (direction x in FIG. 2), and the image generating apparatus 100 includes: a specifying unit 105x which specifies a line 803 (FIG. 8) included in the first image 2 (FIG. 2, upper column in FIG. 7, right column in FIG. 8) and passing through an intersection (under-camera point) 801 between an imaging plane 807 and a vector (unit under-camera vector) 806 in a vertical direction (direction z in FIG. 8) having an endpoint at the imaging apparatus 101; and an image extension processing unit 103 which generates the second image 3 by sampling pixels from the first image 2 along the specified line 803.

More specifically, for example, by specifying a plurality of pixels included in the line 803, the line 803 made up of these pixels is specified.

For example, pixels included, in the second image 3, in a line 5bL in a top-bottom direction 3y of the second image 3 as a result of the sampling described above are pixels that have been sampled to be included in the specified line 803. More specifically, as a result of sampling the pixels from the line 803L that are included in the first image 2, the direction 4bd of a person 100h in a first image portion 4bI that is a first image portion in the same direction as a direction 803L of the line 803 is converted to an appropriate direction (direction 2y) as described above. This converts a direction 5bd of the person 100h in a second image portion 5bI to an appropriate direction after change (direction 2y), thus simplifying the configuration of the detector.

In addition, for example, the first image 2 to be captured includes the image portion 4bI which includes image of a person 4b (in FIG. 7), the direction 4bd from a foot to a head of the person 4b included in the image portion is different from the top-bottom direction 2y of the first image 2; this different direction 4bd is the same direction as the direction of the line 803 passing through an intersection 801 of a vertical vector 806 and an imaging plane 807 (the first image 2 projected onto the imaging plane 807) and through a position of the image portion 4bI; and the specification unit 105x specifies the direction 803L of the specified line 803 as the direction 4bd of the person 4b; the second image 3 to be generated includes an image portion 5bI including image of a person 5b that is the same person as the person 4b; and the included image portion 5bI is an image portion generated by converting the specified direction 803L (direction 4bd) in the image portion 4bI included in the first images 2 to the top-bottom direction 3y of the second image 3.

With this, despite being captured downward at the angle (angle of depression, installation angle of depression) 201, the image portion 4bI is converted to the image portion 5bI, so as to prevent detection of the person 4b located in the inappropriate direction 4bd in the image 4bI and detect the person 5b in the appropriate direction 5bd in the image portion 5bI. This allows simplifying the configuration used for the detection (for example, human detector 100d in FIG. 2).

Note that the inappropriate direction is, for example, a direction different from the direction (direction 4ad) of another person (person 4a) that is other than one person (person 4b) to be detected.

In other words, the appropriate direction is a direction that is the same direction as the direction (direction 5ad) of the other person (person 5a) that is not the one person (person 5b), and so on.

Note that the direction (directions 4ad and 5ad) of the other person in the image (the first image 2, the second image 3) is, for example, the top-bottom direction (directions 2y and 3y) of the image.

Note that the imaging plane 807, for example, is an area onto which the first image 2 is projected. This imaging plane 807 may be, for example, a plane on which the captured first image 2 is projected when the first image 2 is captured by an imaging element provided in the imaging plane 807. In addition, the imaging plane 807, for example, is not a plane in which the imaging element is provided, but may simply be a plane in which in the case of providing an imaging element and so on, the first image 2 is assumed to be projected onto the imaging element.

Note that the imaging plane 807 is, for example, a plane in which an optical axis (see a vector 805 in FIG. 8) of the imaging apparatus 101 passes through a center (see position 9x in FIG. 3) of the plane, and which is perpendicular to the optical axis.

Thus, a first plane, which is the imaging plane 807 when the angle 201 at which the imaging apparatus 101 is placed to be oriented downward is an angle 201b that is another angle different from one angle 201a (FIG. 2), is different from a second plane that is the imaging plane 807 when the angle 201 is the one angle 201a.

In other words, one line (see one direction 803La) that is the line 803 specified when the angle 201 is the other angle 201b is different from the other line that is the line 803 specified when the angle 201 is one angle 201a.

The data representing the angle 201 may be provided (see the parameter holding unit 104 in FIG. 1 and so on).

For example, the data may be held by the image generating apparatus 100 or may be obtained by an obtaining unit 100g (FIG. 2) from the imaging apparatus 101.

Note that the angle 201 indicated by the obtained data (see data 101d in FIG. 2) may be, for example, an angle detected by a detecting unit (gyroscope and so on) 101s included in the imaging apparatus 101.

The data may be, for example, the data that is input to the image generating apparatus 100 by a user of the system 100s and so on operating on the image generating apparatus 100.

When the obtained data indicates the one angle 201a, it is possible to specify, from the pixels in the first line, the pixels included in the line 5bL in the top-bottom direction 3y in the generated second image 3, as being the pixels included in one line specified in this case and included in the first image 2, and so on.

When the obtained data indicates the other angle 201b, it is possible to specify, from the pixels in the other line, the pixels included in the line 5bL in the top-bottom direction 3y in the generated second image 3, as being the pixels included in the other line specified in the case and included in the first image 2, and so on.

With this, in both cases where the angle 201 is the one angle 201a and where the angle 201 is the other angle 201b, it is possible to generate an appropriate image for the second image 3.

Note that, for example, the angle 201 may be the one angle 201a when the imaging apparatus 101 is installed in one place, and may be the other angle 201b when the imaging apparatus 101 is installed in the other place.

In addition, for example, the angle 201 may be the one angle 201a during one period, and may be the angle 201b during another period that is a subsequent period following the one period.

Note that accordingly a center position 9x of the first image 2 and a direction 9xd of a line (straight line) passing through the position of a first image portion 4bI are assumed.

This direction 9xd is another direction that is not a direction representing an upward direction of the vertical direction z (a negative direction of the direction z) in a space 100r in which a person 100h is present (see the "base point" and the "center" in Non-Patent Reference 2 described earlier).

In this context, the direction 9xd is specified, and processing based on the specified direction 9xd is performed, so that it is possible to avoid inappropriate processing to be performed by the processing based on the other direction.

In other words, this specifies the direction 803L of the line 803 passing through the point 801 in the vertical direction z from the imaging apparatus 101 and the position of the first image portion 4bI on the first image 2 projected onto the imaging plane 807. This allows performing processing based on the specified direction 803L, thus allowing performance of appropriate processing.

First Embodiment

With reference to FIGS. 1 to 19, the configuration of a system 100s according to a first embodiment is to be described.

FIG. 1 is a diagram showing the system 100s in the first embodiment of the present invention.

The system 100s includes an image conversion processing unit (image generating apparatus) 100 and an imaging apparatus 101.

In FIG. 1, the image conversion processing unit 100 receives, as input, a captured image (first image) 2 captured by the imaging apparatus 101, and includes a captured image obtaining unit 102, an image extension processing unit 103, a parameter holding unit 104, and a corresponding point calculating unit 105.

Note that part or all of the image conversion processing unit 100 may be, for example, a computer including a CPU, a ROM, a RAM, and so on. By causing the computer to execute the program, each function to be realized by the image conversion processing unit 100, such as a function of the captured image obtaining unit 102, may be realized in this image conversion processing unit 100.

Note that the image conversion processing unit 100 may be part of the imaging apparatus 101.

In addition, the image conversion processing unit 100 may be provided, for example, outside of the imaging apparatus 101. For example, the image conversion processing unit 100 may be provided in a space distant from a space to be imaged and monitored by the imaging apparatus 101, such as a building entrance. Such distant space may be, for example, a guard station of the building.

The imaging apparatus 101 is a monitoring apparatus which monitors, by itself, a relatively wide range. In this case, the imaging apparatus 101 is a monitoring camera using a wide-angle lens (see a lens 101L in FIG. 2 to be hereinafter described), which performs image capturing of the monitored space.

Figure 2:
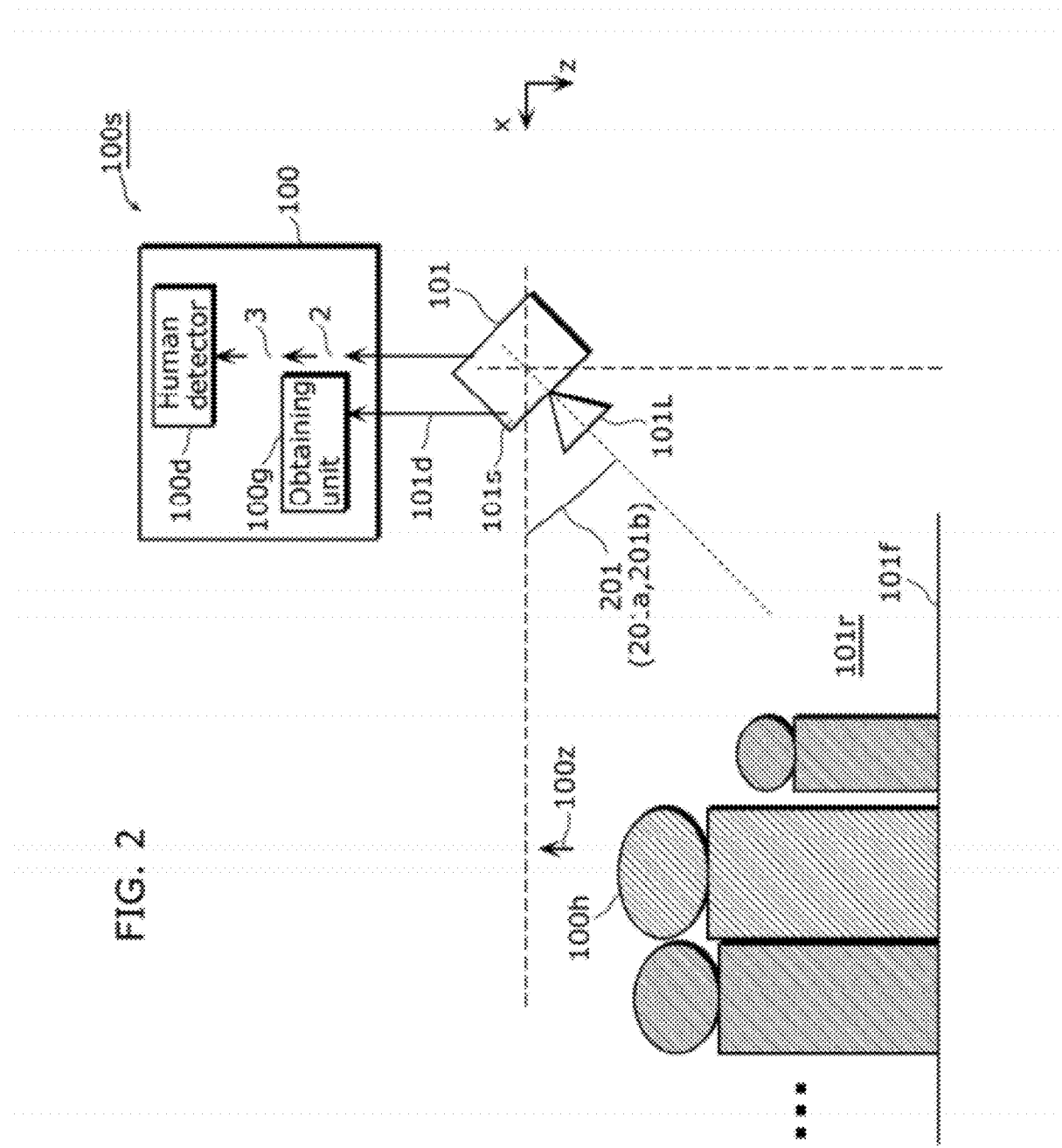
FIG. 2 is a diagram showing an example of the imaging apparatus according to the first embodiment.

FIG. 2 is a diagram showing an example of the imaging apparatus 101.

Figure 3:
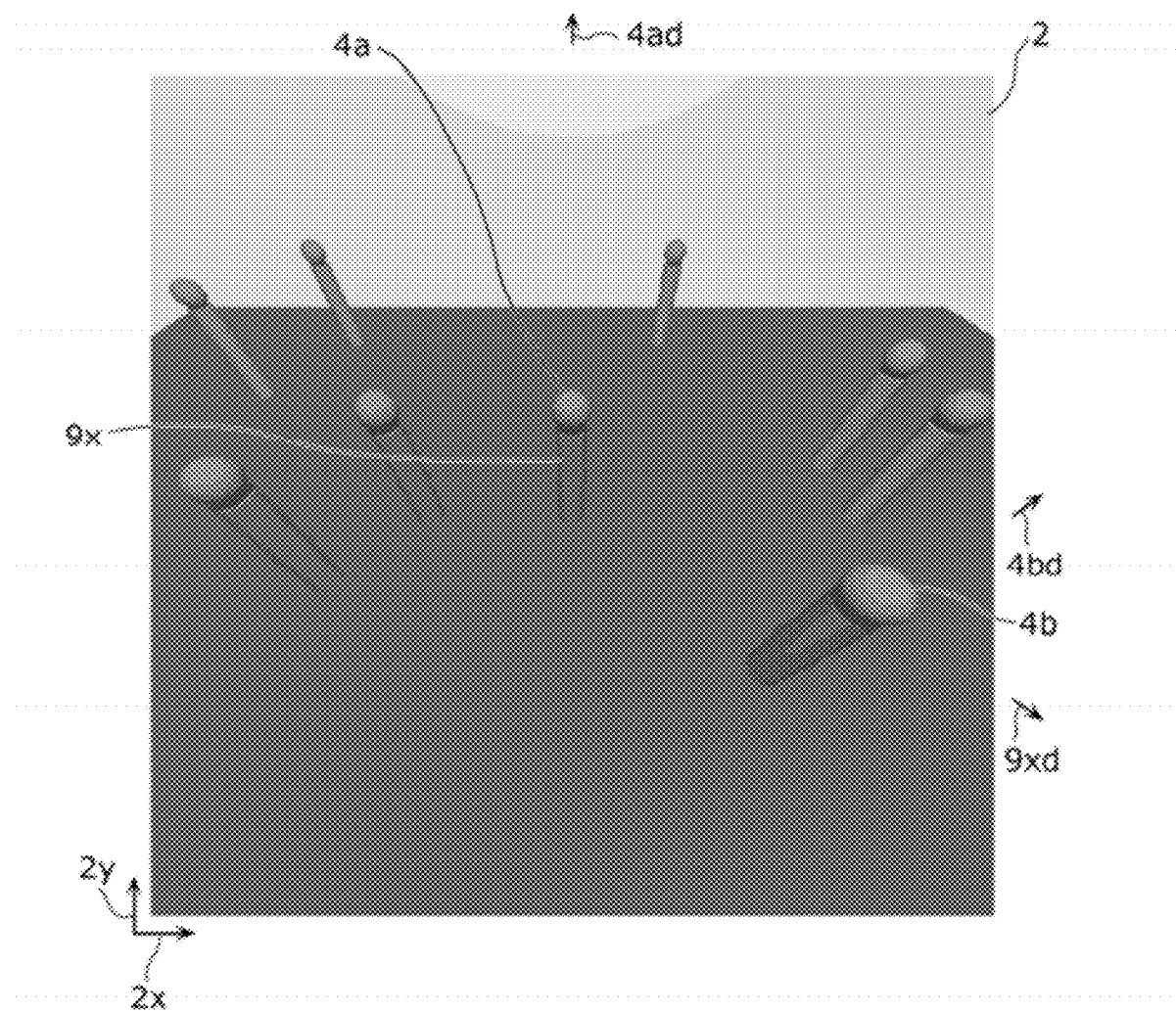
FIG. 3 is a diagram showing an example of the imaging apparatus according to the first embodiment.

FIG. 3 is a diagram showing an example of the captured image 2.

FIG. 3 shows an example of the captured image 2 when the imaging apparatus 101 is installed at a position higher than a floor surface 101f, at a certain installation angle of depression (angle) 201 as shown in FIG. 2. The captured image 2 is a digitized and recorded piece of three-dimensional spatial information (image) projected onto the imaging plane 807 of the imaging apparatus 101 (see FIGS. 4 to 6, FIG. 8, and so on to be hereinafter described).

Briefly described here are a projection of the three-dimensional spatial information onto the imaging plane 807 and a conversion between a physical coordinate system on the imaging plane 807 and an image coordinate system on the captured image 2.

Figure 4:
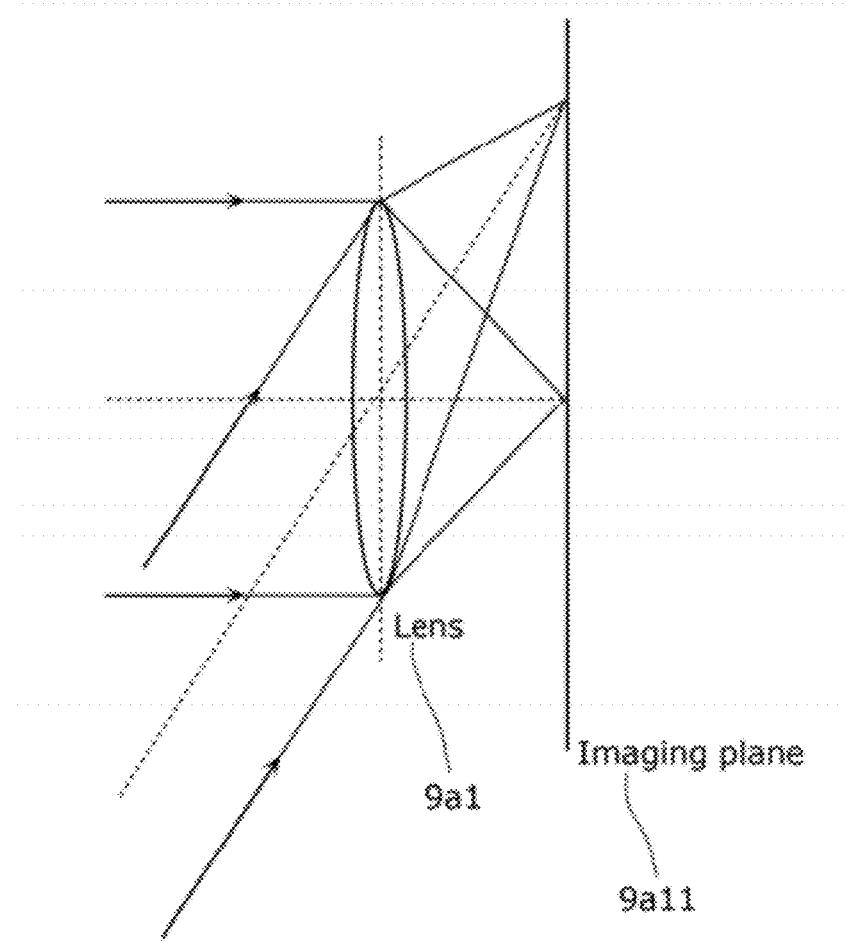
FIG. 4 is a diagram showing a projection onto an imaging plane through a lens.

FIG. 4 is a diagram showing a state of projection performed by an imaging apparatus using a model lens.

Light, which is emitted from a certain point in a three-dimensional space, is concentrated onto a certain point in an imaging plane gall, according to an incident angle onto the imaging plane 9a11. In the model lens, a plurality of light collection points at which the light is condensed and collected are concentrated on a plane (imaging plane 9a11).

Thus, placing an imaging element such as a CCD on this plane allows capturing a sharp image.

Such lens and imaging element causes a projection from the three-dimensional space to the two dimensional space.

In this context, considering only the geometrical properties of the imaging apparatus, it is possible to approximate this imaging apparatus to a pinhole camera in a pinhole camera model by focusing only on a single point in a center of the lens.

Figure 5:
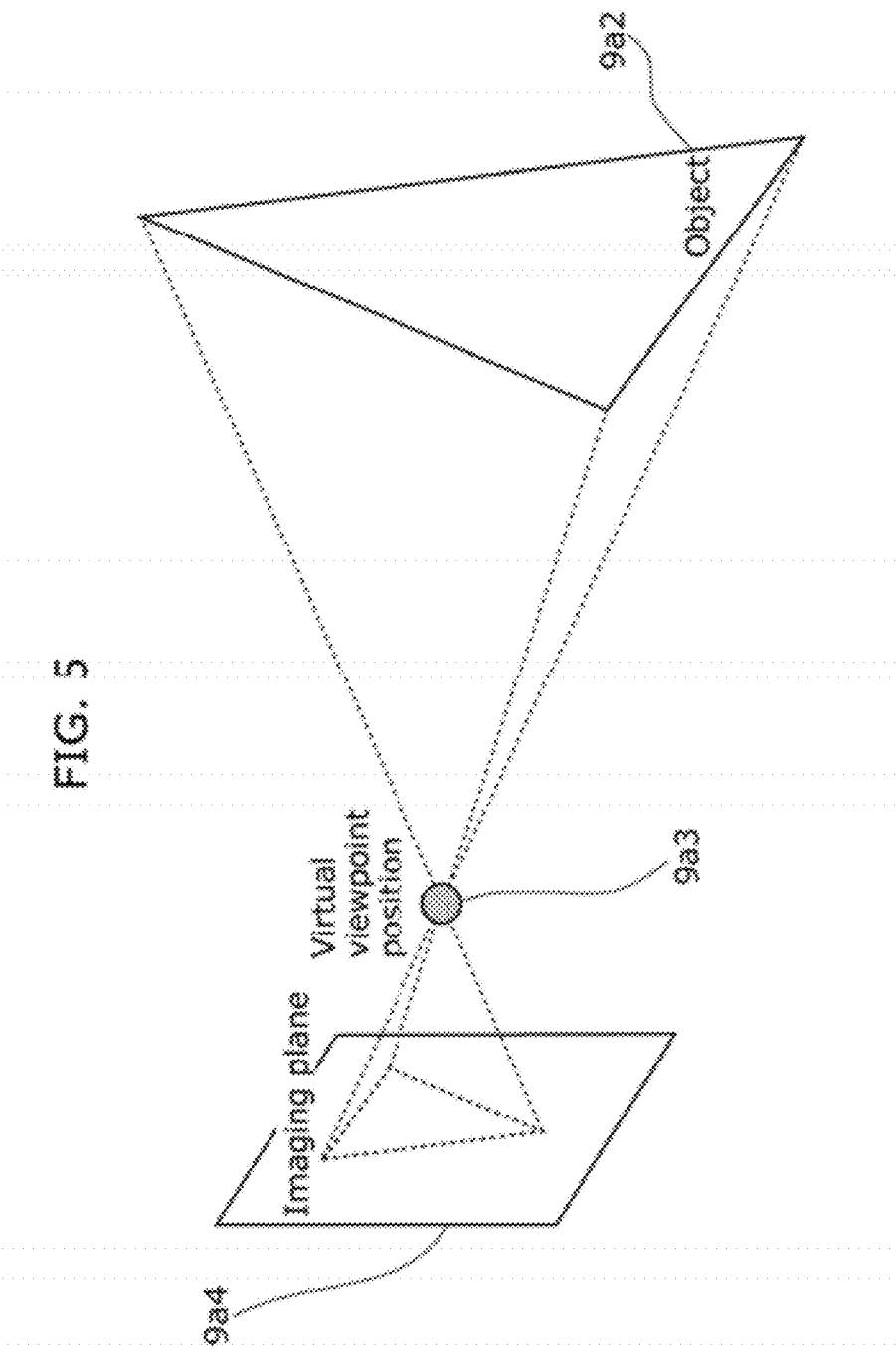
FIG. 5 is a diagram showing a state of projection using a pinhole camera.

FIG. 5 is a diagram showing a state of projection by a pinhole camera.

The center of the lens is a virtual viewpoint position 9a3, and the plane to which the light is collected is an imaging plane 9a4. In addition, a distance between the virtual viewpoint position 9a3 and the imaging plane 9a4 is a focal distance.

Figure 6:
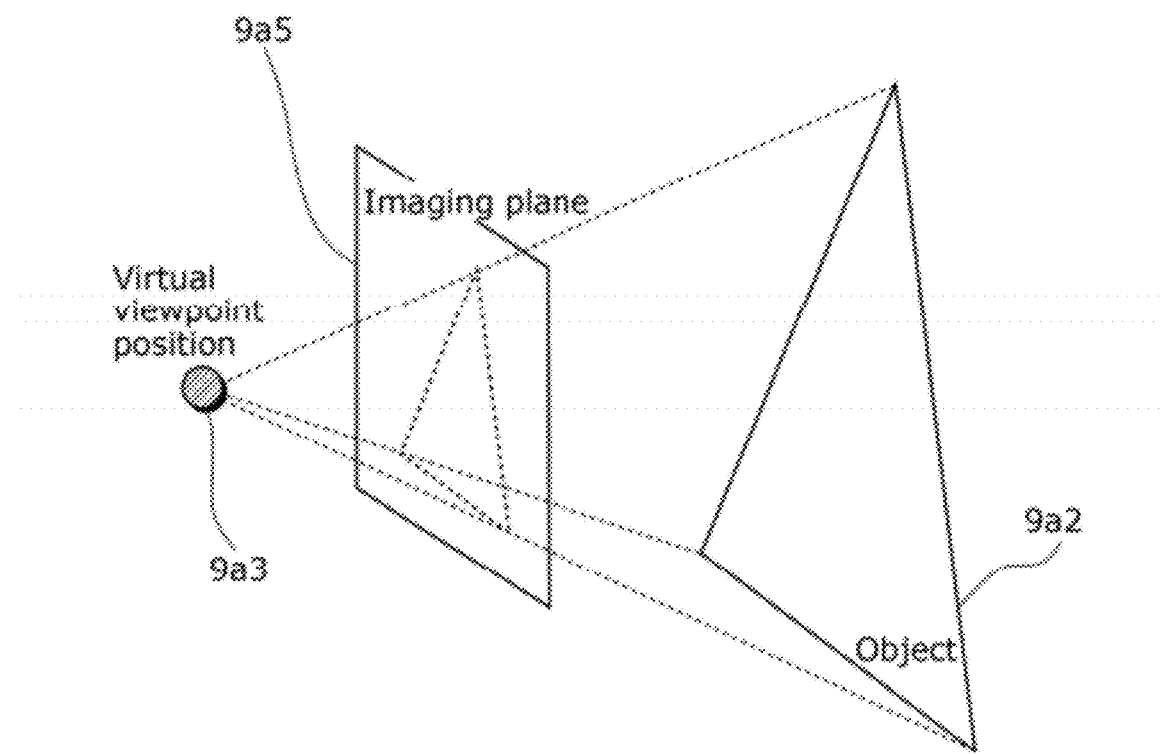
FIG. 6 is a diagram showing the imaging plane placed in front of a virtual viewpoint position.

FIG. 6 is a diagram in which the imaging plane shown in FIG. 5 is placed in front of the virtual viewpoint position 9a3.

As shown in FIG. 5, in the pinhole camera, an object 9a2 is projected upside down, but as shown in FIG. 6, when the imaging plane (imaging plane 9a5) is placed in front of the virtual viewpoint position 9a3, the object is projected without being reversed. Since similarity between objects to be projected onto the imaging plane is ensured even if the imaging plane (imaging plane 9a5) is placed as shown in FIG. 6, the imaging plane is hereinafter considered to be located on the object 9a2 side.

In an actual imaging apparatus, by providing, in the imaging plane, an imaging element such as a CCD or CMOS, analog three-dimensional space information such as intensity of the light that has reached each element in the imaging device is converted to a digital signal, to generate a captured image.

Next, a coordinate (coordinate system) conversion between the physical coordinate system on the imaging plane and the image coordinate system on the captured image is described.

It is possible to freely determine an origin, an aspect ratio, and so on of the image coordinate system on the captured image, independently of the physical coordinate system.

This requires, when modeling the actual camera, considering the conversion from the physical coordinate system to the image coordinate system.

For performing this conversion, it is only necessary to obtain a translation for positioning the origin of the coordinate system and a scale conversion constant corresponding to an aspect ratio or a focal length.

Generally, these parameters are referred to as internal parameters, and are represented in form of a matrix.

Use of such matrix allows a conversion between image coordinates on the captured image and physical coordinates on the captured image. With this, considering a certain pixel in an image, it is possible to calculate to find, in the physical coordinate system, through which point on the imaging plane the light has passed to be collected to the virtual viewpoint position.

In the image conversion processing unit 100, it is assumed that the internal parameters in the imaging apparatus 101 are known.

At this time, the angle of depression (installation angle of depression, angle) 201 and the internal parameters are held by the parameter holding unit 104. Note that, for example, the angle 201 may be one of the internal parameters.

The imaging apparatus 101 transmits the captured image 2 generated through the procedures above, to the image extension processing unit 103 via the captured image obtaining unit 102 (FIG. 1).

The captured image obtaining unit 102, for example, is a recording and reproduction unit for the captured image 2.

The image extension processing unit 103 performs processing on the captured image 2 obtained from the captured image obtaining unit 102, and outputs an extended image (second image) 3 in which tilts of people in the captured image 2 are unified from the captured image (first image) 2.

Figure 7:
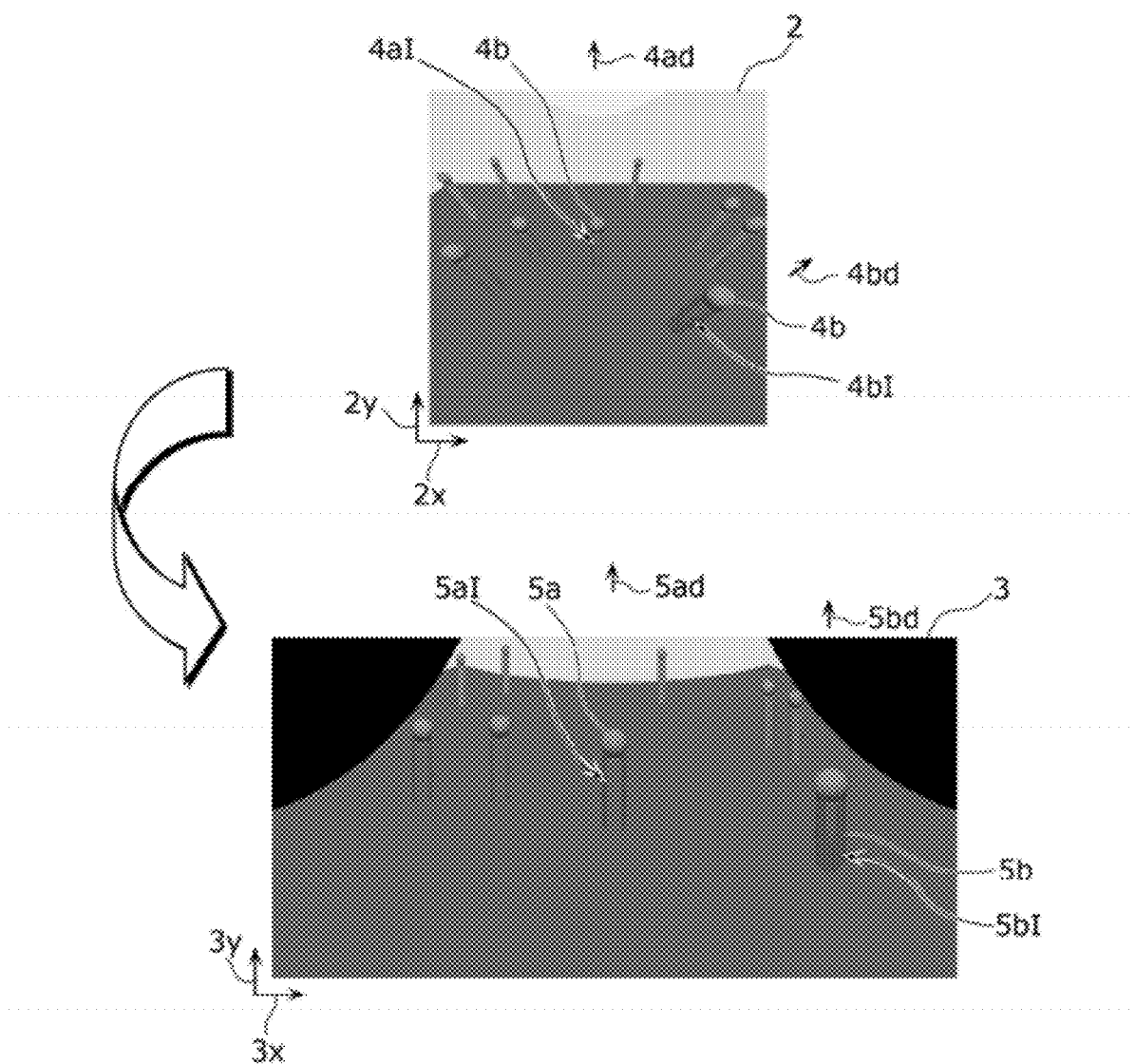
FIG. 7 is a diagram showing an example of a captured image and an extended image that is output by an image conversion processing unit according to the first embodiment.

FIG. 7 is an example of the extended image (second image) corresponding to the input captured image 2.

The image extension processing unit 103 generates an extended image 3 by performing a certain image conversion (to be described in detail below), which is similar to processing of panoramic extension for omnidirectional images.

At this time, the corresponding point calculating unit 105 (FIG. 1) calculates each coordinate in the image (captured image 2, extended image 3) necessary for this conversion.

The content of the image extension processing will be described.

Figure 8:
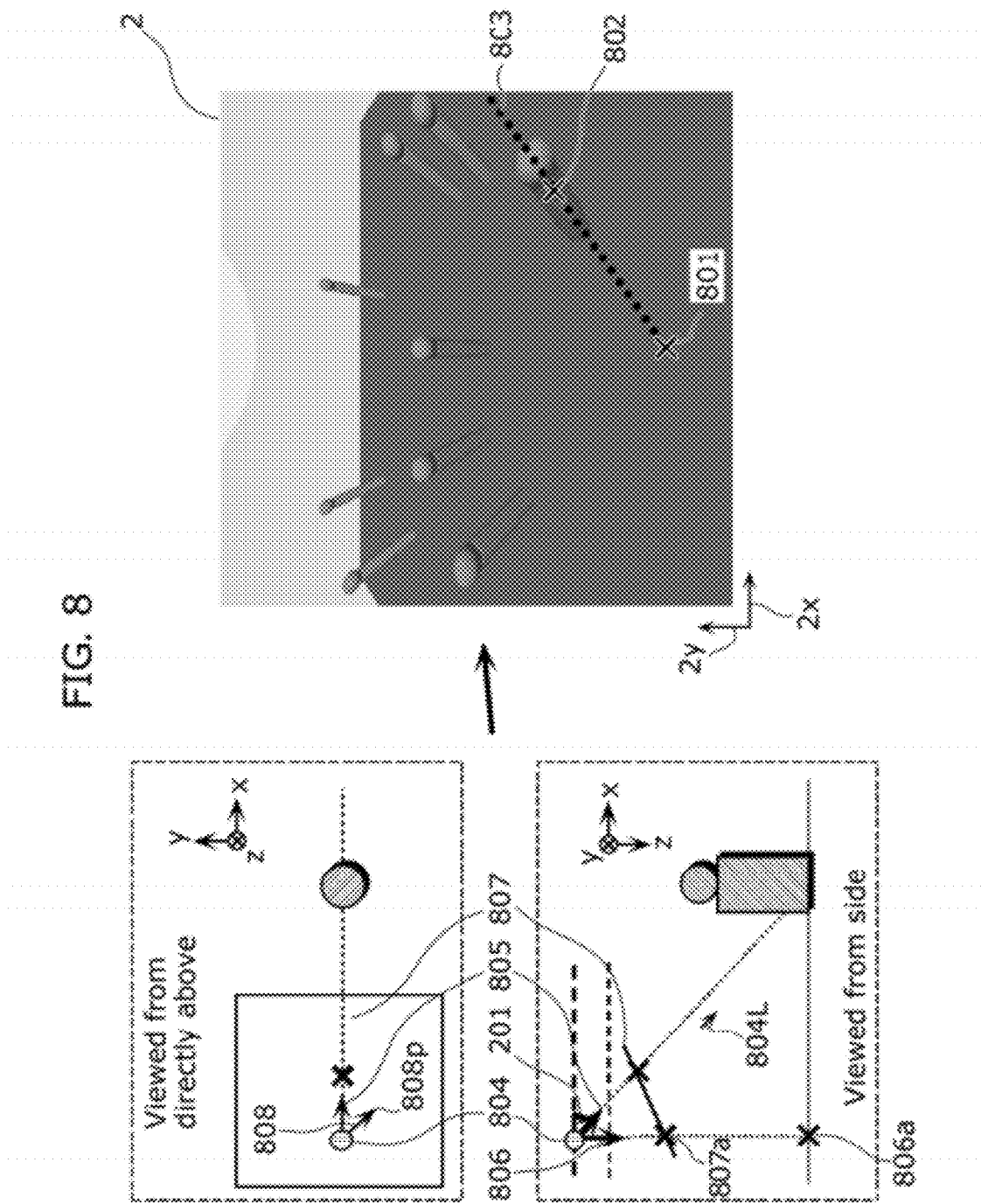
FIG. 8 is a diagram in which an under-camera point, equal depression angles, and half lines connecting them are drawn on the captured image according to the first embodiment.

FIG. 8 is a diagram showing the captured image 2 and so on.

In FIG. 8, on the captured image 2, an under-camera point 801, an equal depression angle point 802, and a half line 803 connecting these points are drawn.

Figure 9:
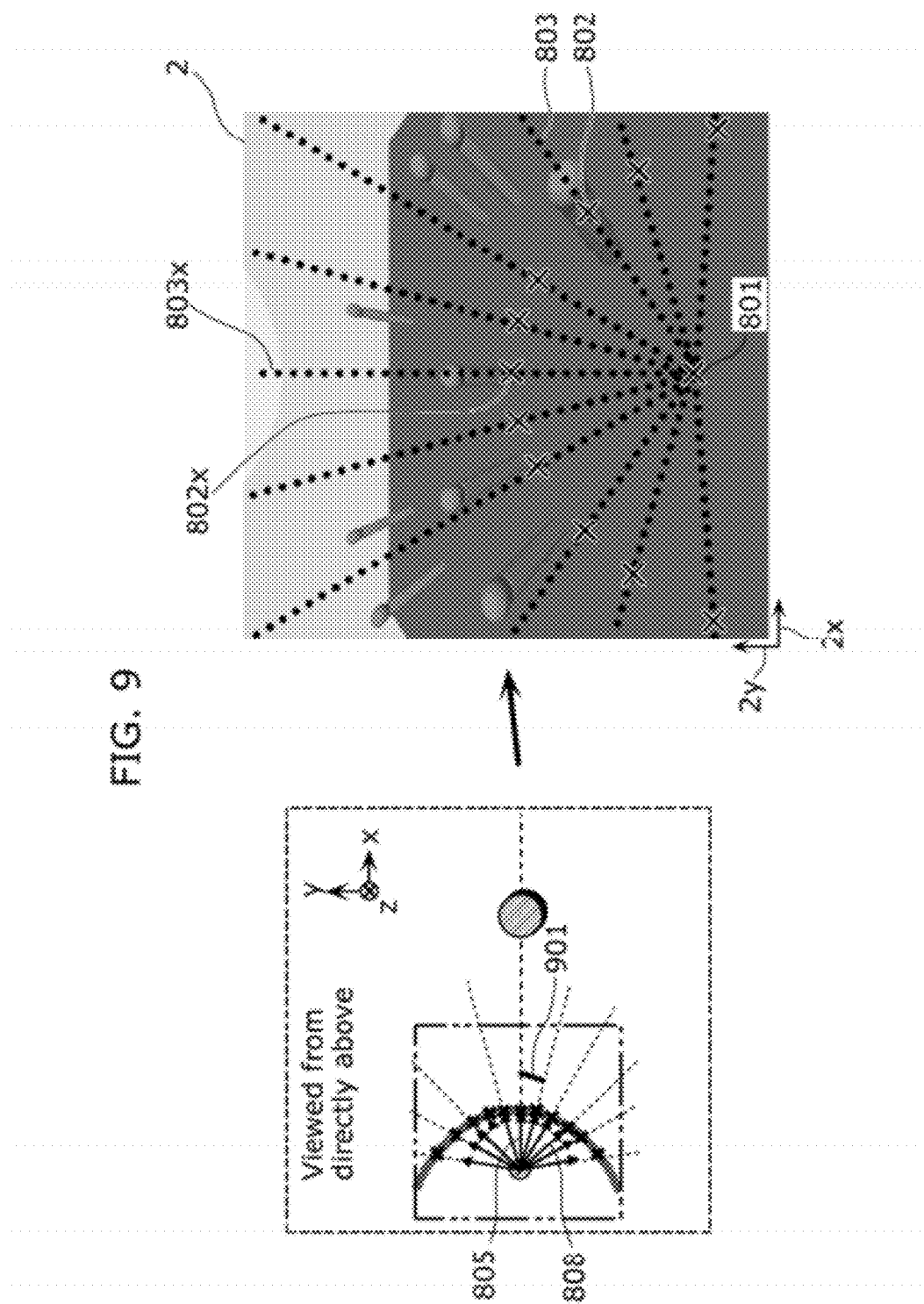
FIG. 9 is a diagram in which the half lines are drawn on the captured image according to the first embodiment.

FIG. 9 is a diagram in which a plurality of half lines 803 are drawn on the captured image 2.

First, a method of calculating a corresponding point necessary for the image conversion is described with reference to FIGS. 8 and 9.

The corresponding point calculating unit 105 calculates the under-camera point 801 and the equal depression angle point 802 in the captured image 2. Subsequently, a half line 803 is created (specified) by setting an end point to the under-camera point 801 and extending a line from the end point to the equal depression angle point 802.

In FIG. 8, 804 represents a virtual viewpoint position (position of the imaging apparatus 101). 805 represents a unit optical-axis vector that is a unit vector directed in the optical axis direction 804L of the imaging apparatus 101. 806 represents a unit under-camera vector that is a unit vector directed from a camera installation point toward a vertically and directly downward direction (z direction).

In addition, 807 is assumed to represent an imaging plane of the imaging apparatus 101, on which the second captured image 2 is projected.

Note that the imaging plane 807 is of the same concept as the imaging plane in FIG. 6 and is different from the actual camera imaging plane; however, the image that can be obtained in this imaging plane 807 is an image whose similarity with the captured image 2 in the actual camera imaging plane is ensured.

At this time, the under-camera point 801 is a point indicating an intersection (point 807a in FIG. 8) between the unit under-camera vector 806 and the imaging plane 807, which is drawn on the captured image 2 by coordinate conversion using internal parameters.

Likewise, the equal depression angle point 802 is an intersection (point 808p) between the imaging plane 807 and a vector 808 (upper left column, in FIG. 8) rotated in a zenith angle direction according to a sampling angle 901 that is a predetermined angle (FIG. 9), at an angle obtained by integral-multiplying this sampling angle 901, which is drawn on the captured image 2 by coordinate conversion.

Note that FIG. 9 illustrates, as an example, the vector 808 rotated at an angle obtained by tripling the sampling angle 901.

This sampling angle determines the intervals and the number of equal depression angle points, and the number of half lines is determined accordingly.

Note that FIG. 9 illustrates 11 half lines among a plurality of the half lines to be specified.

As a result, this accordingly determines a horizontal resolution of the extended image 3.

The sampling angle 901 (FIG. 9) is held by the parameter holding unit 104.

Note that in calculating the equal depression angle points 802, a unit optical-axis vector 805 is used as an example, but it is only necessary that each vector rotated in the zenith angle direction has the same angle of depression, and it is not essential to use the unit optical-axis vector 805. Note that as described above, for example, one of the respective vectors has the same angle of depression as that of another vector, and the one vector is a vector generated by rotating the other vector, around the vertical direction z as a rotational axis.

FIG. 9 illustrates, on the captured image 2, an intersection (equal depression angle point 802) between the imaging plane 807 and each vector 808 obtained by rotating the unit optical-axis vector 805 in the zenith angle direction.

Note that FIG. 9 illustrates, on the captured image 2 as an example, an equal depression angle point 802x obtained by rotating the unit optical-axis vector 805 just by zero degree and directly extending the unit optical-axis vector 805. The specified half lines 803, for example, may include such half lines 803 at the equal depression angle point 802x that are obtained by directly extending the unit optical-axis vector 805.

Figure 10:
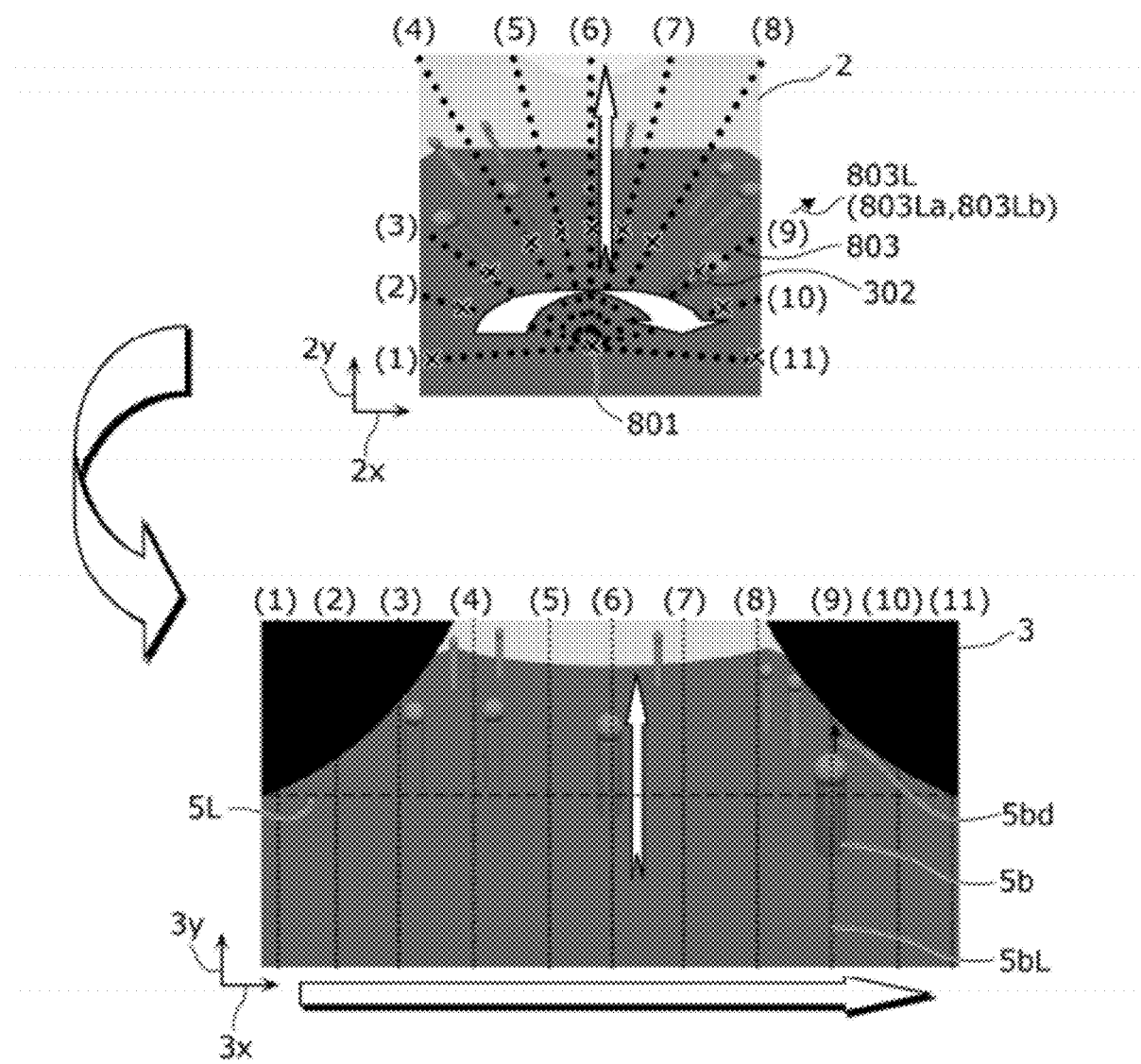
FIG. 10 is a diagram showing an image conversion method according to the first embodiment.

FIG. 10 is a diagram showing an image conversion method.

Next, a method of generating the extended image 3 using the half lines generated according to the under-camera point 801 that is the end point of the half line 803 and the equal depression angle points 802 is described with reference to FIG. 10.

First, when focusing on one half line 803, as shown in FIG. 10, assuming that sampling is performed on the half line 803 on the captured image 2 at certain intervals on the captured image 2 from an under-camera point 801 side toward the equal depression angle point 802, the result of the sampling corresponds to one vertical line in the extended image 3 (see the line 5bL in FIG. 10). For the direction of the line 5bL on the extended image 3, the under-camera point 801 side corresponds to a lower side of the extended image 3 (a negative side of the direction 3y), and an equal depression angle point 802 side corresponds to an upper side of the extended image 3 (a positive side of the direction 3y).

In other words, the direction from the under-camera point 801 toward the equal depression angle point 802 in the captured image 2 is converted to a direction, in the extended image 3, from the lower side of the extended image 3 toward the upper side (positively directed toward the direction (top-bottom direction) 3y).

Note that for example, the line 5bL in the top-bottom direction 3y of the extended image 3 is considered.

The extended image 3 may include, in this line 5bL, a pixel included in the half line 803 in the captured image 2.

In other words, for example, the pixel in the line 5bL as described above may have the same pixel value as that of the pixel in the half line 803 or may be pixel a value of a neighboring pixel and the like.

The pixel value of the neighboring pixel is a pixel value or the like corrected by approximating the pixel value of the pixel in the half line 803 to a pixel value of the neighboring pixel thereof.

The extended image 3 may include, in this line 5bL, each pixel in the half line 803 in the captured image 2.

The captured image 1 may include one pixel located at a closer side to the under-camera point 801 (a negative side of the top-bottom direction 2y of the captured image 2) and another pixel on a farther side (a more positive side in the top-bottom direction 2y).

The extended image 3 may include the one pixel on a more negative side of the top-bottom direction 3y of the extended image 3 and the other pixel on the more positive side.

Note that a technique of determining the sampling intervals on the half line 803 (see intervals 1201 and 1202 in FIG. 12, and so on to be hereinafter described) will be described later.

A plurality of sampling results on the half lines 803 are processed as shown by (1) to (11) in an upper portion (captured image 2) of FIG. 10 and by (1) to (11) shown in a lower portion (captured image 3). In other words, the angles of the half lines 803 have an order based on the under-camera point 801 of the captured image 2 as an origin. Each of the sampling results is included in the extended image 3 in the same order as the order of the half lines 803 on which the sampling has been performed. In other words, the extended image 3 is generated by arranging the sampling results in these half lines 803 in the same order as the order of the half lines 803, from left to right in a horizontal direction (in the left-right direction 3x).

In other words, each half line 803 in the captured image 2 has an order ((1) to (11) in the upper part).

Each line 5bL in the extended image 3 has an order ((1) to (11) in the lower part).

For example, pixels in an earlier half line 803 (sampling result) may be included in an earlier line 5bL.

In addition, a horizontal resolution of the extended image 3 is determined by the number of half lines 803; FIG. 10 only illustrates part of the half lines 803, but in practice, half lines 803 equivalent in number to the horizontal resolution of the extended image 3 are generated.

Figure 11:
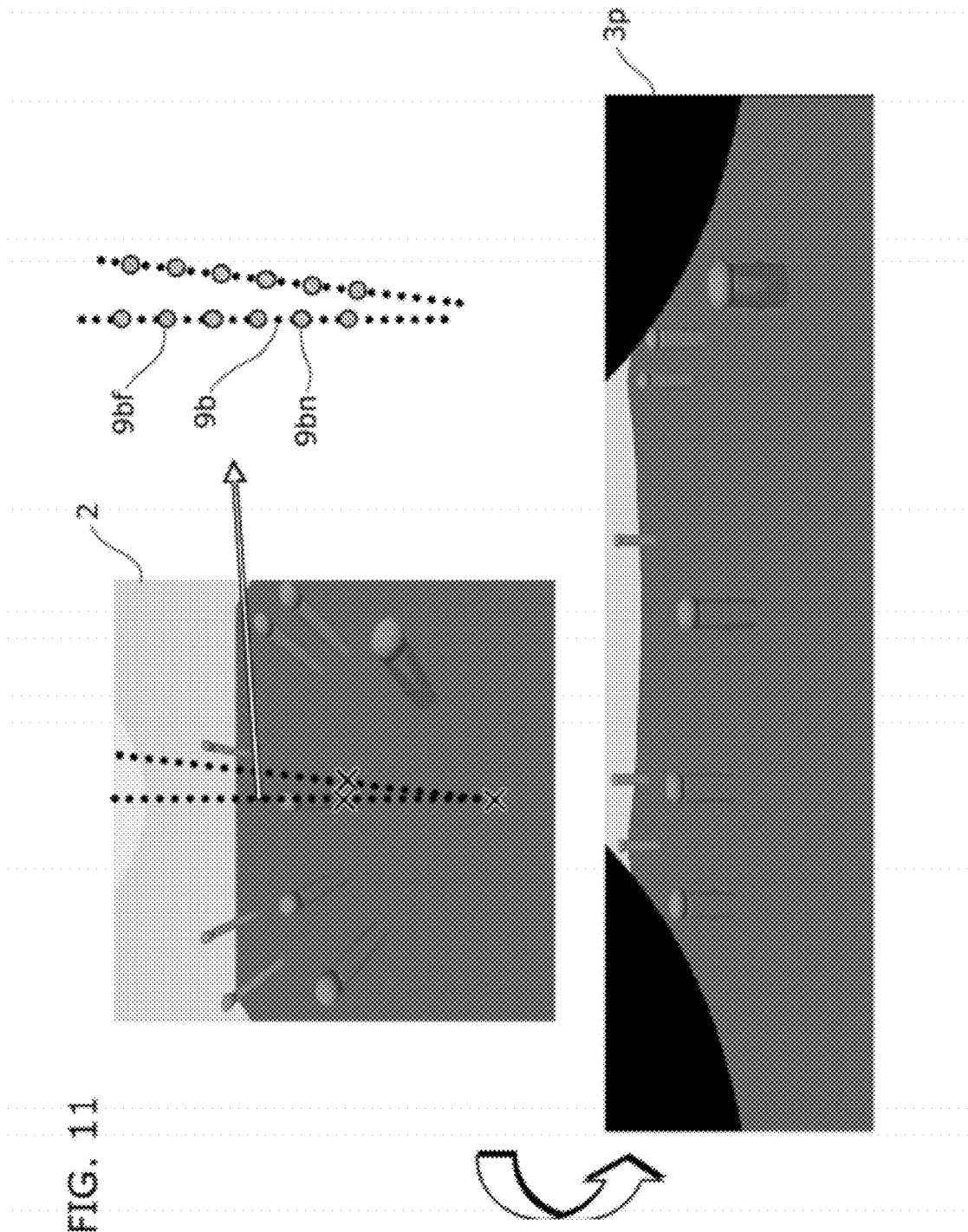
FIG. 11 is an extended image with a constant sampling interval when performing image conversion according to the first embodiment.

FIG. 11 is a diagram showing an extended image 3p that is an extended image 3 when setting constant sampling intervals (intervals 9b) for image conversion.

Figure 12:
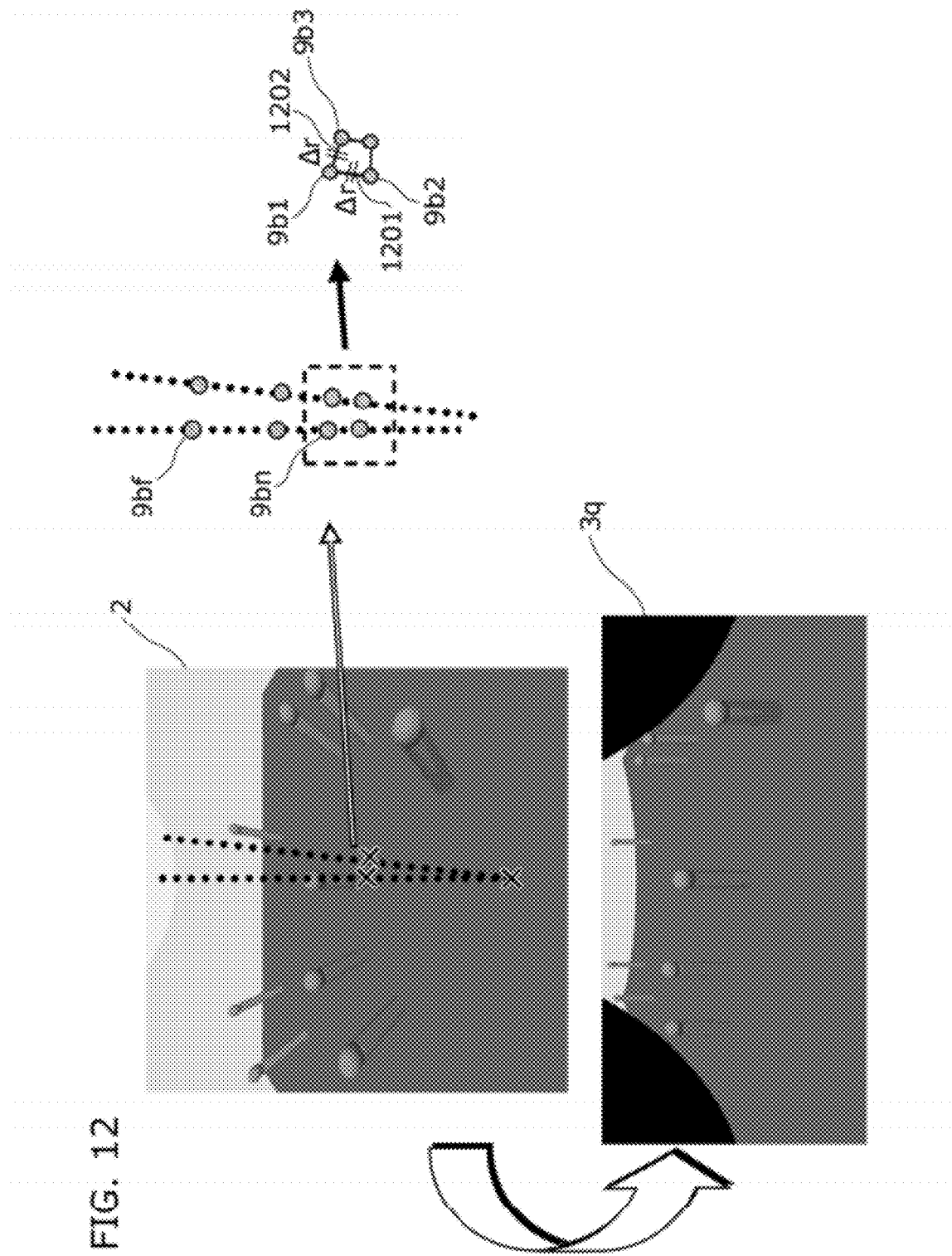
FIG. 12 is an extended image with a sampling interval to give a locally equal aspect ratio when performing image conversion according to the first embodiment.

FIG. 12 is a diagram showing an extended image 3q that is the extended image 3 when setting sampling intervals for image conversion to locally equalize an aspect ratio.

Here, an example of determining the sampling intervals will be described with reference to FIGS. 11 and 12.

In the extended image 3, the resolution in a longitudinal direction (the direction indicated by the top-bottom direction 3y in FIG. 10) is determined by the sampling intervals in the half line 803 in the captured image 2.

In addition, the resolution in a cross direction is determined by the number of half lines 803, that is, the number of equal depression angle points 802.

Thus, setting the sampling intervals simply at a constant value as shown in FIG. 11 causes the aspect ratio of a person to change depending on which region among a plurality of regions of the extended image 3 includes an image of the person (see the extended image 3p in FIG. 11).

Note that for example, as shown in the extended image 3p in FIG. 11, in a lower region in FIG. 11 which is a region on a relatively negative side in the top-bottom direction 3y, a ratio of a length in the longitudinal direction (top-bottom direction 3y) with respect to a length in the cross direction (left-right direction 3x) is relatively high.

On the other hand, this ratio is relatively low in an upper region which is a region on a relatively positive side in the top-bottom direction 3y.

As a result, this requires more identifiers for human detection, so that the significance of performing image conversion is undermined.

Note that for example, this requires another identifier to perform the detection in the upper region along with the identifier to perform the detection in the lower region, thus causing increase in the number of identifiers.

Thus, as shown in FIG. 12, the number of half lines 803 and the sampling intervals on the half lines 803 are not determined independently of each other, by equalizing a radius direction sampling interval 1201 in a radius direction (the direction of the half line 803) and a circumferential direction sampling interval 1202 in a circumferential direction (a circumferential direction centering on the point 801 that is the end point of the half line 803) (for example, by setting a ratio to 1:1 as shown by two "Δr"s in FIG. 12). Accordingly, it is possible to generate a more appropriate extended image 3 (extended image 3q in FIG. 12) in which an aspect ratio of the person is retained more sufficiently than in the case of setting these numbers independently.

As a result, the extended image 3 appears as shown by the extended image 3q in FIG. 12, thus reducing the number of detectors for human detection.

Figure 13:
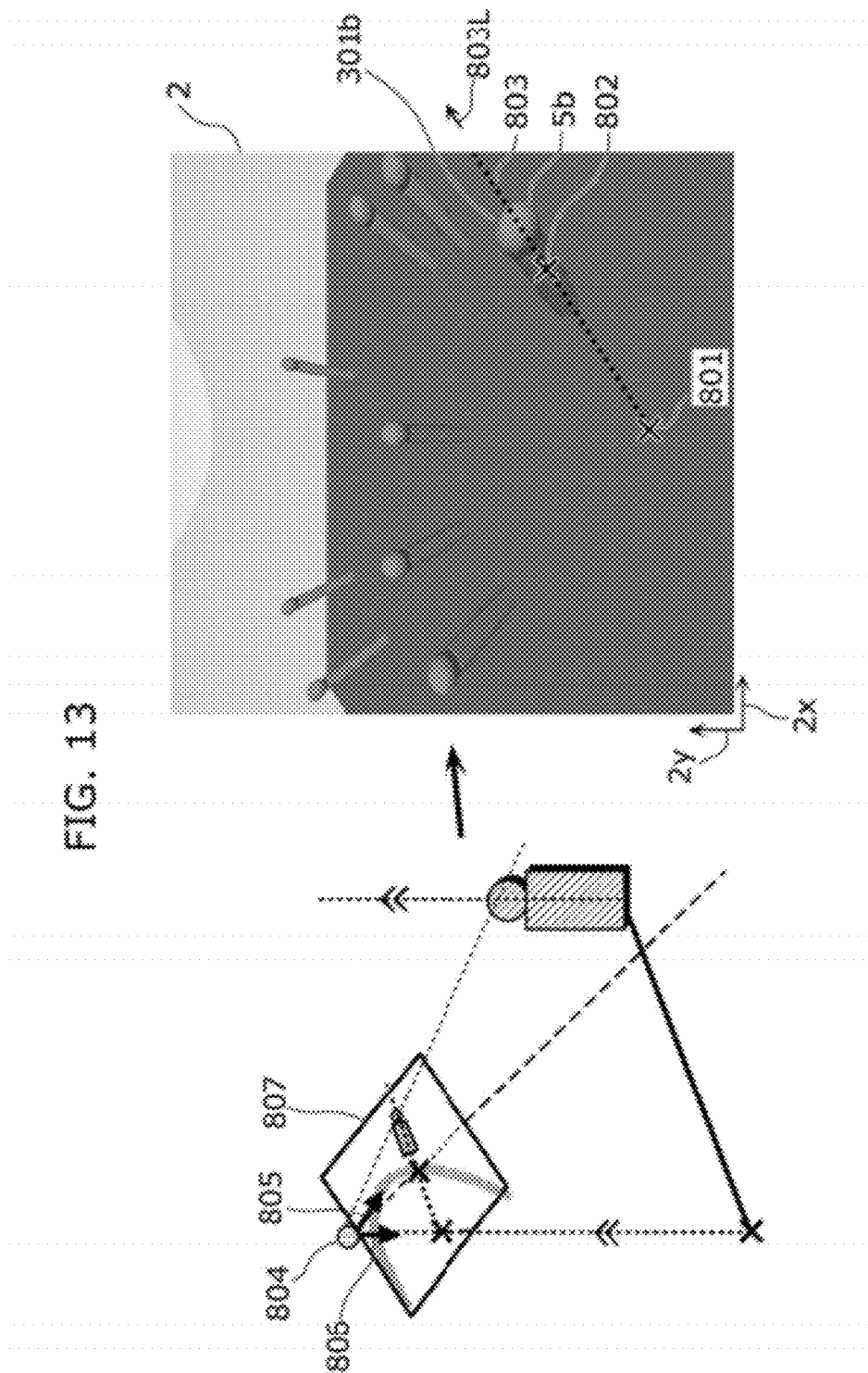
FIG. 13 is a conceptual diagram showing that tilts of objects are unified when performing image extension according to the first embodiment.

FIG. 13 is a conceptual diagram that indicates unification of tilts.

In addition, for the half line 803 connecting the under-camera point 801 and each equal depression angle point 802, as shown in FIG. 13, the image of the object or person vertical to the ground is included constantly along the half line 803 in the captured image 2. In other words, the direction of the person and so on (person 4b and so on) captured in the extended image 3 (the direction 4bd in FIG. 3) is the same direction as the direction 803L (FIG. 13) of the half line 803 passing through the position of the person and so on.

Thus, by sampling (extracting), along the half line 803, a plurality of pixels included in the half line 803, it is possible to generate the extended image 3 in which the tilts of the people and so on (objects) are unified regardless of the positions of the people and so on in the image.

Next, as described above, the operation of the image conversion processing unit 100 having the configuration as described above will be described.

Figure 14:
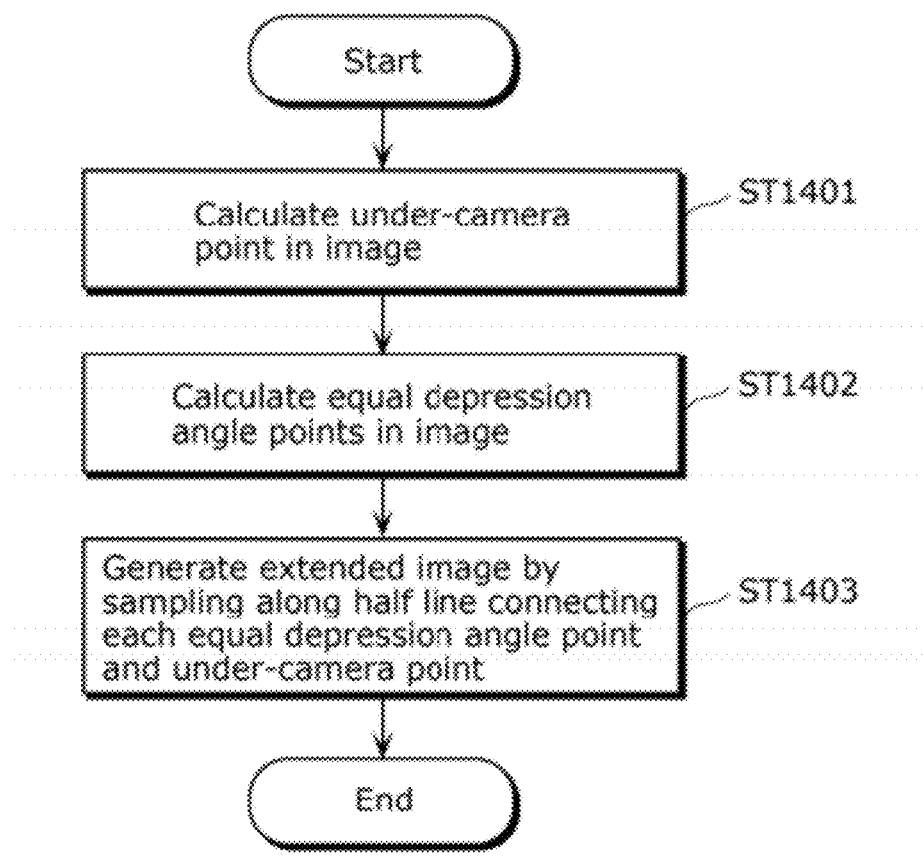
FIG. 14 is a diagram showing an operation flow of the imaging apparatus according to the first embodiment.

FIG. 14 is a flow diagram for describing the operation of the image conversion processing unit 100.

Note that as will be described in detail later, for example, the angle 201 (FIG. 2) may be changed from an angle before change (one angle 201a) to an angle after change (the other angle 201b). In other words, as described earlier, the imaging apparatus 101 is installed to be oriented downward at the angle of depression 2 with respect to the horizontal direction x (FIG. 2). For example, the optical axis of the installed imaging apparatus 101 is directed downward as described earlier. This angle 201 may be changed. For example, the processing in FIG. 14 to be described may be performed based on the angle 201 after change (angle 201b), when the angle at which the apparatus is installed is changed to the angle after change (angle 201b).

In step ST1401, the corresponding point calculating unit 105 calculates the under-camera point 801 in the captured image 2 (described earlier), using the installation angle 201 (angle after change 201a) and the internal parameters.

In step ST1402, the corresponding point calculating unit 105 calculates each equal depression angle point 802 in the captured image 2, using the installation angle 201, the internal parameters, and a sampling angle 901 (FIG. 9).

In step ST1403, the image extension processing unit 103 generates the extended image 3, based on the captured image 2 received from the captured image obtaining unit 102, using the under-camera point 801 and the equal depression angle points 802 (information 4 in FIG. 1) that are calculated by the corresponding point calculating unit 105.

According to the first embodiment, regardless of the position in the captured image 2 in the monitoring apparatus, it is possible to generate an image (the second image 3 and so on in FIG. 10 and so on) having the same tilt by unifying a tilt of each object or person at a position thereof with a tilt of the person and so on at another position thereof. This only requires one feature quantity in object detection, particularly in human detection, thus facilitating the detection processing.

Thus far, the system 100s in the first embodiment of the present invention has been described, but the present invention is not limited to this embodiment.

For example, in FIG. 1, the imaging apparatus 101 has been described as a monitoring camera using a wide-angle lens, but may also be a monitoring camera that captures all the directions using a hyperboloidal mirror, and it is only necessary to allow calculating the under-camera point and a group of equal depression angle points. In this case, the under-camera point and the equal depression angle points in the captured image can be calculated by reflectance calculation of a light vector.

Second Embodiment

Figure 15:
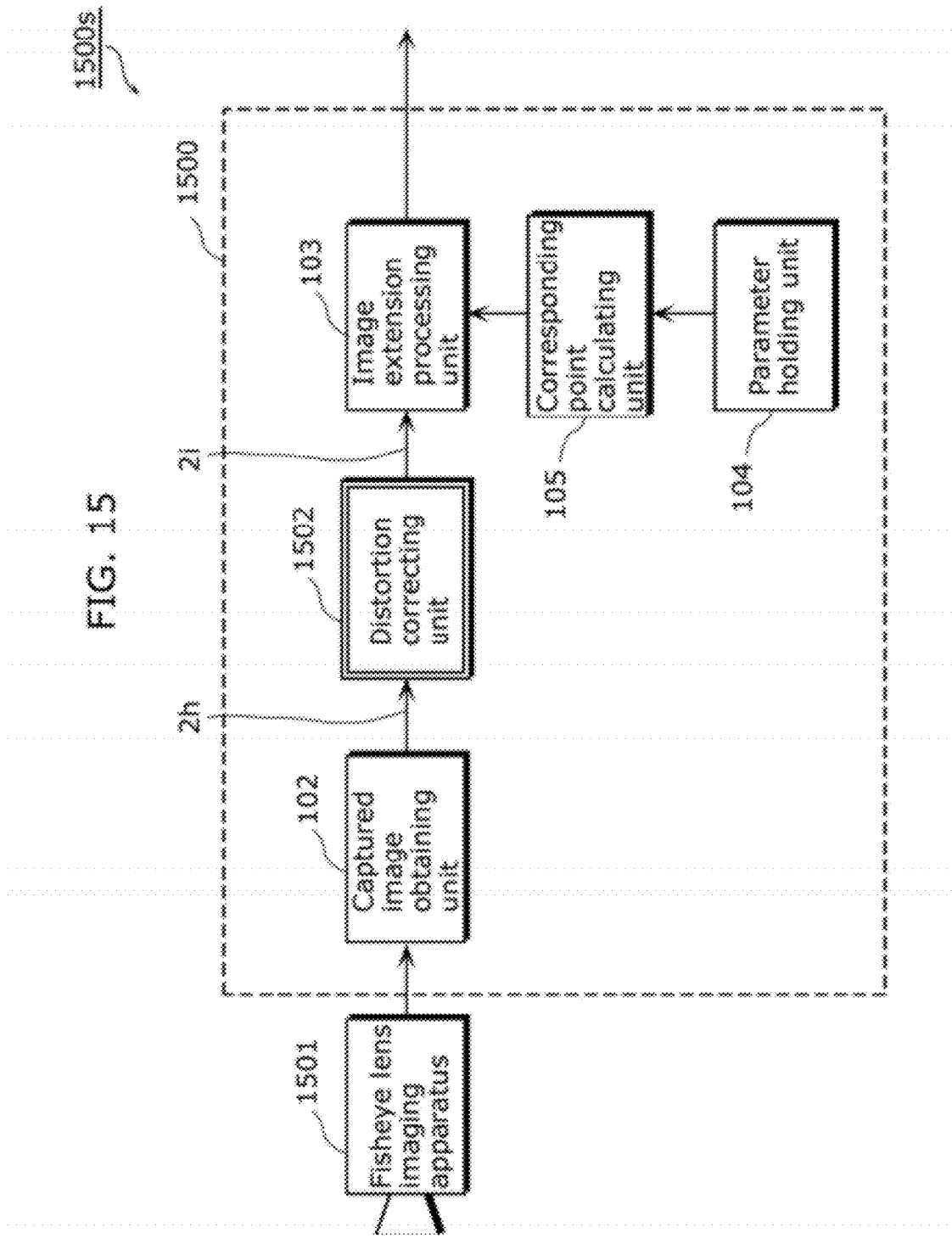
FIG. 15 is a block diagram showing a configuration of an imaging apparatus according to a second embodiment.

FIG. 15 is a block diagram showing a configuration of a system 1500s.

With reference to FIG. 15, the configuration of the system 1500s in the second embodiment is to be described.

Note that in FIG. 15, the same numerical references are used for the same constituent elements as those in FIG. 1, and thus the detailed description thereof is omitted accordingly.

FIG. 15 shows an image conversion processing unit 1500 and a fisheye lens imaging apparatus 1501 according to the second embodiment.

In FIG. 15, 1502 is an image distortion correcting unit.

The fisheye lens imaging apparatus 1501 is an imaging apparatus which allows imaging a wider range using a fisheye lens (see the lens 101L in FIG. 2) instead of a normal lens.

Figure 16:
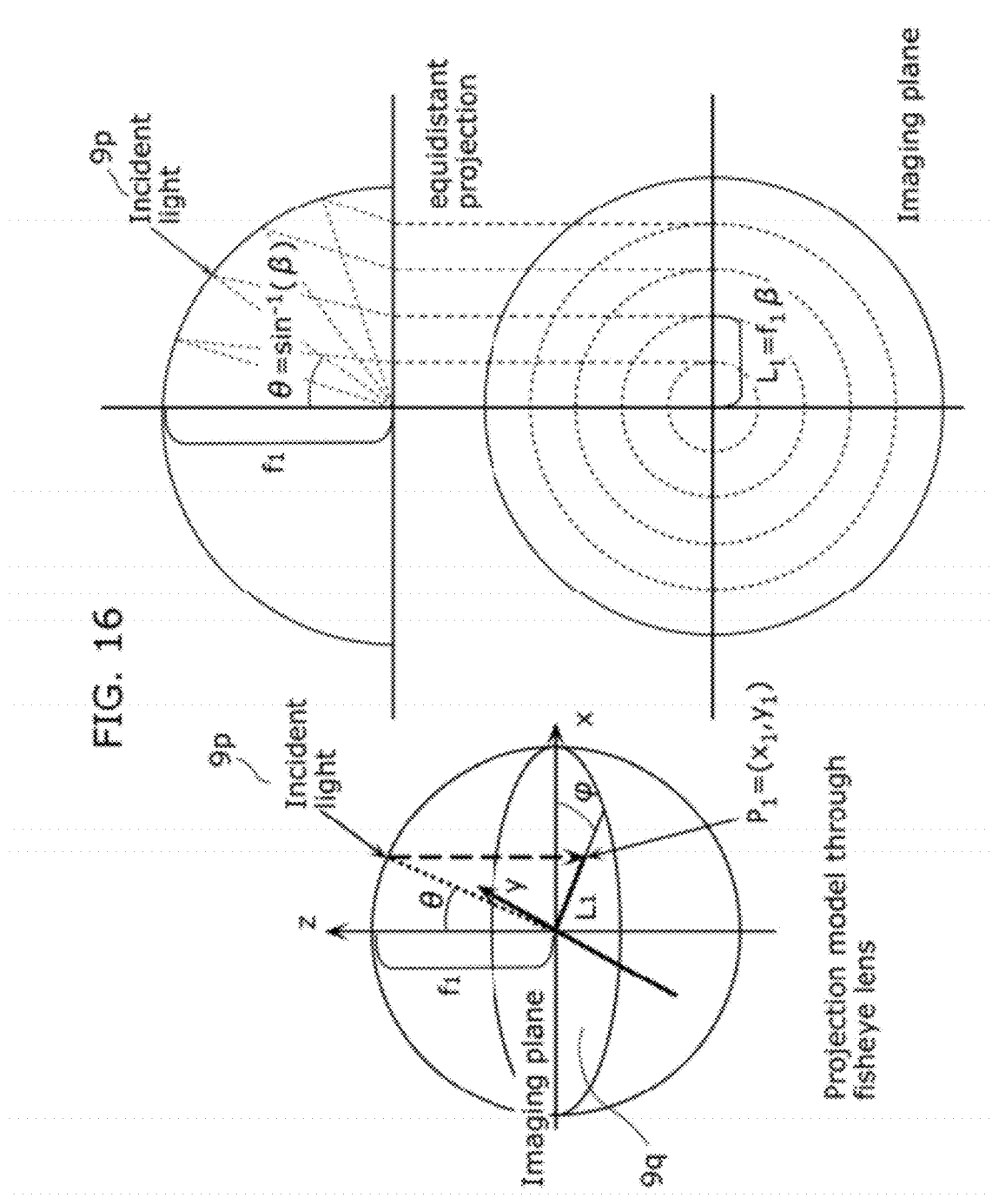
FIG. 16 is a diagram showing a projection method of a fisheye lens.

FIG. 16 is a diagram modeling a projection state of an incident light 9*p* onto an imaging plane 9*q*, in an equidistant projection fisheye lens.

When f1 is a focal length of the fisheye lens, θ is an incident angle (zenith angle) of the light, and ϕ is a zenith angle, in the case of equidistant projection, a distance L1 from the center of the imaging plane 9*q* is determined to be proportional to the incident angle θ.

Accordingly, as shown in Expression (1), when a relationship between β and θ is determined, L1 and β has a relationship as represented by Expression (2).

In addition, L1 and imaging plane coordinates P1=(x1, y1) have a relationship as represented by Expressions (3) and (4).

Note that most fisheye lenses adopt the equidistant projection method.

[Math. 1]

$$\theta = \sin^{-1} \beta \quad (1)$$

$$L_1 = f_1 \beta \quad (2)$$

$$x_1 = L_1 \cos \phi \quad (3)$$

$$y_1 = L_1 \sin \phi \quad (4)$$

Figure 17:
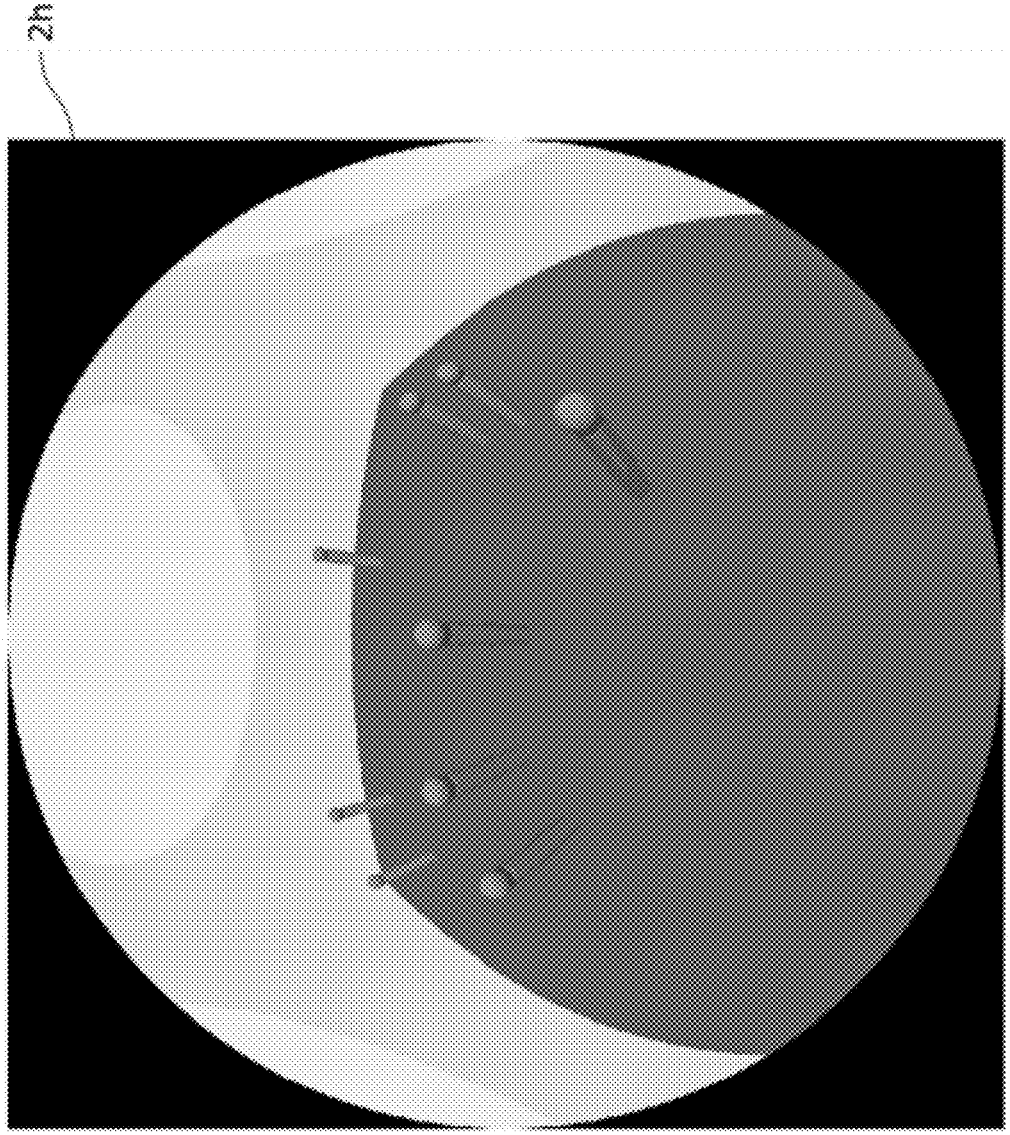
FIG. 17 is a diagram showing an example of the imaging apparatus according to the second embodiment.

FIG. 17 is a diagram showing an example of a captured image 2*h*.

FIG. 17 shows an example of a fisheye-lens captured image 2*h* that is captured in the case of installing the fisheye lens imaging apparatus 1501 of the equidistant projection type, under a condition equivalent to the condition for the imaging apparatus 101 that captures the captured image 2 in FIG. 3.

As shown in FIG. 17, the image captured using the fisheye lens of the equidistant projection type has a distortion peculiar to the fisheye lens, but it is possible to generate, by performing the conversion as below, an image having the distortion corrected.

Figure 18:
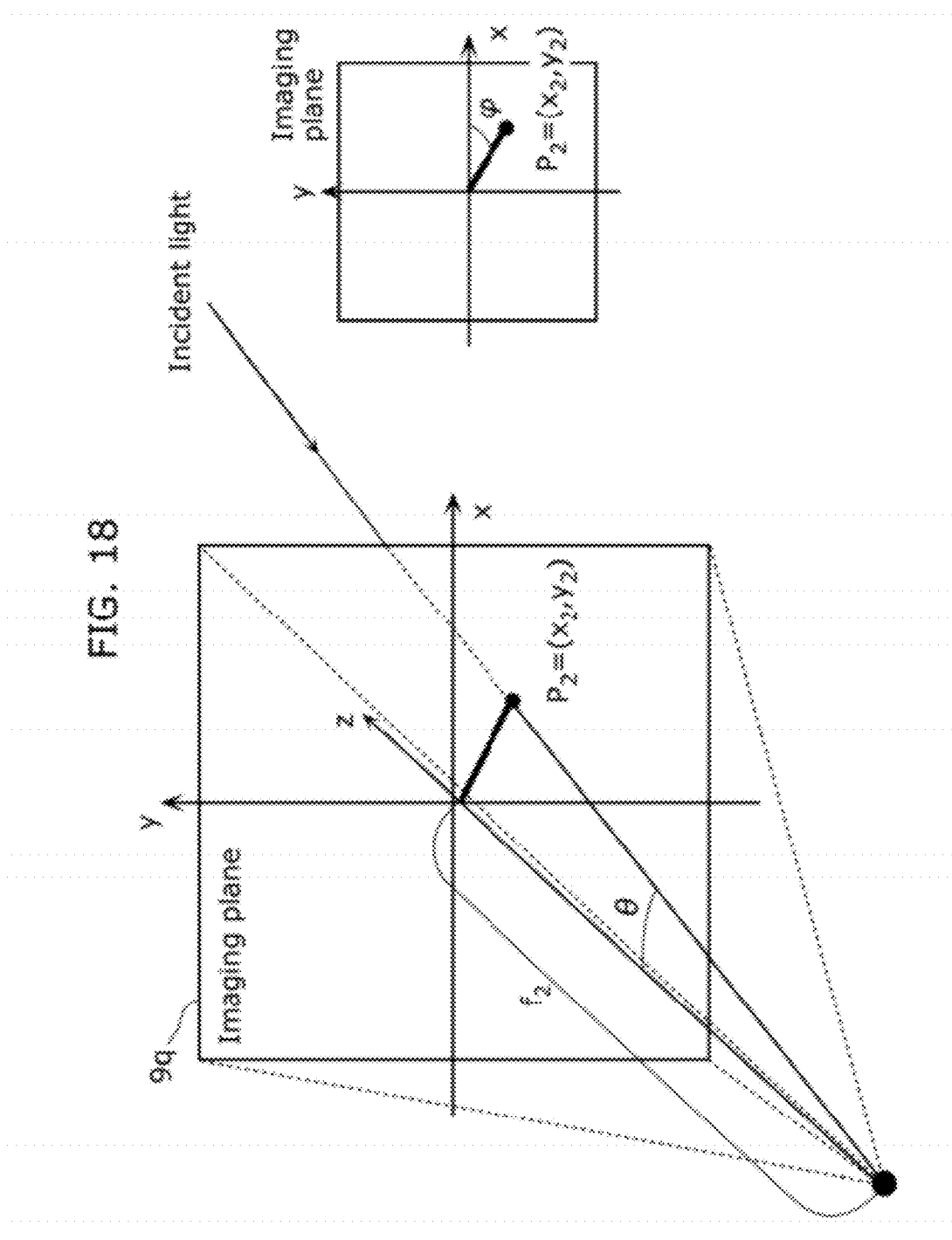
FIG. 18 is a diagram showing a projection method for a normal lens (central projection model)

FIG. 18 is a diagram representing a projection state of the incident light, in the lens of a central projection type.

Here, when considering the lens of the central projection type having a focal length f2, a distance L2 from a center of the imaging plane is represented by Expression (5) below, and a relationship between L2 and the imaging plane coordinates P2=(x2, y2) is represented by Expressions (6) and (7).

[Math. 2]

$$L_2 = f_2 \tan \theta \quad (5)$$

$$x_2 = L_2 \cos \phi \quad (6)$$

$$y_2 = L_2 \sin \phi \quad (7)$$

Here, according to Expressions (1), (2), and (5), a relationship between L1 and L2 is represented by a relational expression (8) as below.

[Math. 3]

$$L_2 = f_2 \tan\left(\sin^{-1}\left(\frac{L_1}{f_1}\right)\right) \quad (8)$$

According to Expressions (6), (7), and (8), when the focal length of each lens is known and the incident angle and the zenith angle of the light are equal, it is possible to convert the imaging plane coordinates P2 corresponding to the imaging plane coordinates P1. When the internal parameters of the camera are known, it is possible to convert the imaging plane coordinates to image coordinates, thus allowing the image captured using the fisheye lens of the equidistant projection type into an image captured using a lens of the central projection type.

Figure 19:
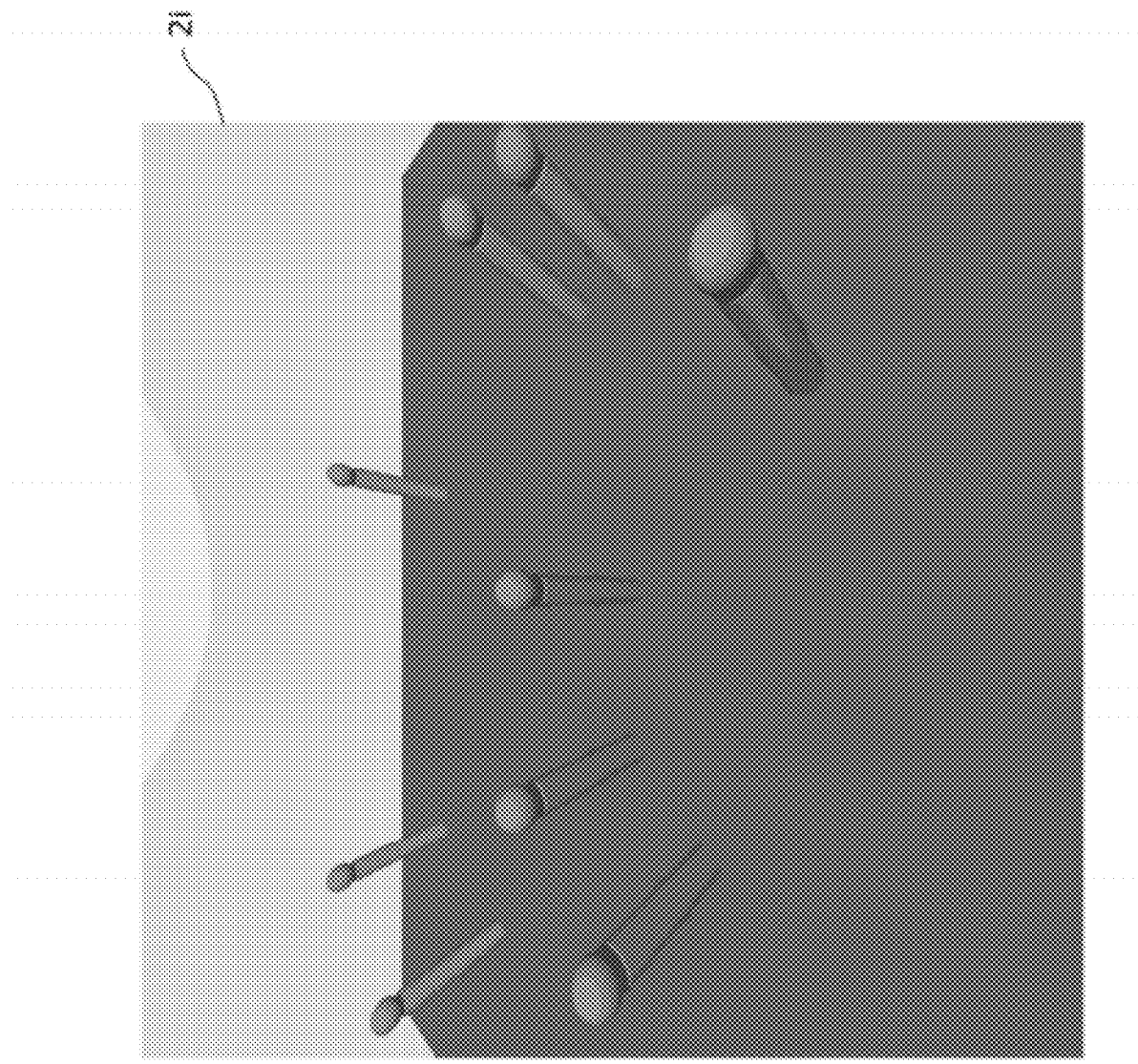
FIG. 19 is a diagram showing an example of an image generated by correcting a captured image by a distortion correcting unit, according to the second embodiment.

FIG. 19 is a diagram showing an example of the corrected image.

FIG. 19 is an example of a distortion-corrected image 2*i* generated by converting the image in FIG. 17 using the conversion described above. FIG. 19 shows that an image captured using a wide-angle lens, which is the same image as the captured image 2 in FIG. 3, can be generated by distortion correction.

As described above, by including an image distortion correcting unit 1502, it is possible to generate an image without distortion (captured image 2*i*), from the fisheye-lens captured image 2*h* that is captured using the fisheye lens imaging apparatus 1501.

Accordingly, subsequently, by performing the same processing as that of the first embodiment, it is possible to generate an image in which tilts of the objects or people are unified regardless of their positions in the captured image 2*i*.

Note that the next operation may be performed as follows, for example.

In other words, the captured image 2 may be captured (see the imaging apparatus 101 in FIG. 1, FIGS. 2 and 3, and so on).

In addition, the captured image 2 may be an image obtained by capturing a lower direction from a higher point than the ground (FIG. 2 and so on) at the angle of depression 201 (FIGS. 8 and 2, and so on) with respect to the horizontal direction (direction x in FIG. 8).

In other words, for example, the imaging apparatus 101 is a monitoring camera and so on.

However, it is possible to consider performing the processing as described earlier, such as human detection, on the captured image 2 thus captured.

In other words, for example, the captured image 2 includes not only one image portion (for example, the first image portion 4*a*I in FIG. 7 and so on) but also the other image portion (the other image portion 4*b*I and so on).

The one image portion is an image portion captured by viewing the vertical direction (the direction from the foot to the head of the person, that is, a negative direction in the z direction in FIG. 8) as the top-bottom direction 2*y* (the direction from the bottom to the top).

Then, the other image portion is captured by viewing the vertical direction (the negative direction in the z direction in FIG. 8) as another direction (diagonal direction) (a diagonally right upward direction 4*bd* in the other image portion 4*b*I in FIG. 7) that is a direction other than the direction of the top-bottom direction 2*y* (the direction from the bottom to the top) as described earlier.

This might complicate the configuration, as described earlier, for example, as a result of requiring an extra identifier appropriate for the processing on the other image portion.

Thus, the extended image 3 (see the lower part of FIG. 7 and so on) may be generated from the captured image 2 (the image extension processing unit 103, ST1403 in FIG. 14).

In other words, as a result of this generation, the other direction as described above that is the direction (direction 4*bd*) in which an image in the vertical direction is captured, may be changed from the direction (direction 4*bd*) in the other image portion to a direction 5*bd* (the direction of the line 5*b*L in the lower part of FIG. 10) in the generated extended image 3 that is the same direction as the top-bottom direction 3*y* of the extended image 3.

Note that the extended image 3 may be, for example, an image and the like generated by adding, to the captured image 2, deformation caused by this change.

Note that for example, a person who appears in the extended image 3 and has the direction 5*bd* as the direction of the person (from the foot to the head) (see the person 100*h* in FIG. 2) is the same person as the person who appears in the captured image 2 and has the direction 4*bd* as the direction of the person.

Note that specifically, as described earlier, this generation may be performed by sampling each pixel along the direction 4*bd* (half line 803L in FIG. 10).

Note that for example, the captured image 2 may be converted into the extended image 3.

Then, the processing such as human detection may be performed on the extended image 3 after change, without performing human detection and other processing on the captured image 2 before change.

With this, the processing is performed on the extended picture 3, so as to avoid, for example, requiring an extra identifier, thus simplifying the configuration.

However, it is noticed that the configuration might not be fully simplified when, for example, complicated processing is performed in a process of, for example, analyzing the captured image 2 for identifying the direction of the direction 4*bd* in which an image of the vertical direction (direction z in FIG. 8) is captured.

In this context, it is noticed that the captured image 2 includes the under-camera point 801 (FIGS. 8 and 9) at which an image of the vertical direction (z direction in FIG. 8) of the imaging apparatus 101 is captured.

More specifically, it is noticed that a direction from this under-camera point 801 to the other image portion (the other image portion 4*b*I) (the direction 803L of the half line 803 in FIG. 10) is the same direction as the direction 4*bd* (FIG. 7 and so on) in the other image portion, in which an image of the vertical direction (direction z) is captured.

Thus, the under-camera point 801 may be specified (the corresponding point calculating unit 105, ST1401).

More specifically, with this, the direction from the specified under-camera point 801 to the other image portion (the direction 803L of the half line 803) may be specified as the direction 4*bd* in which an image of a vertically upward direction is captured.

Then, based on the specified direction 4*bd*, the extended image 3 in which this direction 4*bd* is changed (converted) to the direction 3*y* described earlier may be generated.

This simply requires only simple processing such as specifying the under-camera point 801, so that no complicated processing is performed, thus sufficiently (significantly) reducing the configuration.

Note that for example, the following operation may be performed in a certain aspect.

In other words, the imaging apparatus 101 may capture the first image (captured image) 2.

The first image 2 to be captured may include the first image portion 4*b*I (FIG. 7).

In the first image portion 4*b*I to be included, the person 4*b* appears.

On the other hand, the imaging apparatus 101 that performs image capturing may be installed to be oriented downward with respect to the horizontal direction (direction x in FIG. 2) at the angle of depression 201. Note that for example, the direction of the optical axis of the imaging apparatus 101 is a direction downward at the angle 201 like this.

Accordingly, in the image portion 4*b*I described earlier, the direction 4*bd* from the foot to the head of the person 4*b* captured in this image portion 4*b*I is different and displaced from the direction 4*ad* from the foot to the head of a person 5*a* that appears in the other image portion 4*a*I in the first image 2.

Note that for example, the direction 4*ad* described above, as shown in FIG. 7 and so on, is the same direction as the top-bottom direction 2*y* of this first image 2, and the like.

Thus, the point (under-camera point) 801 as below in the captured first image 2 can be focused.

The point 801 is a point at which a line extended vertically downward from the imaging apparatus 101 (see the unit under-camera vector 806 in FIG. 8) intersects with the plane (imaging plane) 807 which is a surface of the first image 2 and on which the first image 2 is projected (appears).

Specifically, the direction 803L of the line (straight line) 803 passing through this point 801 is the same direction as the direction 4*bd* of the person 4*b* in the one image portion 4*b*I, which is the displaced direction as described earlier.

Thus, the direction 803L of the line 803 described above may be specified by the specifying unit 105*x* (FIG. 1).

More specifically, for example, by specifying a plurality of pixels included in the line 803 and specifying, as the line 803, a line made up of the specified pixels, the direction of the line 803 may be specified.

The second image 3 may be generated from the first image 2.

The generated second image 3 includes the second image portion 5*b*I.

The included second image portion 5*b*I is the image portion generated from converting the specified direction (direction 803L) in the first image portion 4*b*I described earlier to the next direction (direction 3*y*).

The direction is the direction 5*ad* from the foot to the head of the person 5*a* in the other image portion 5*a*I that is other than the image portion 5*b*I described above and includes an image of the person 5*a* that is the same person as the person 5*a* that appears in the other image portion 4*a*I in the second image 3 as described earlier.

Note that this direction 5*ab* is, for example, the same direction as the top-bottom direction 3*y* of the second image 3.

The position of the person 5*b* in the second image 3 may be detected as the position of the person 101*h* (FIG. 2) by the human detector.

Note that this human detector is, for example, a human detector 100*d* (FIG. 2) included in the image conversion processing unit 100.

This allows, for example, simplifying the configuration of the human detector which detects the person 5*b*, for such a reason that this human detector is the same as the human detector detecting the person 5*a* as described above.

Note that for example, the imaging apparatus 101 may capture the first image 2 with the lens 101L included in the imaging apparatus 101.

The lens 101L described above may be a wide-angle lens.

That is, for example, in 35 mm equivalent, a horizontal angle of a standard lens having a focal length of 60 mm is approximately 39.6 degrees.

The wide-angle lens as described earlier refers to a lens having a wider field angle than the field angle of such a standard lens.

Note that data (the angle 201 described above and so on) indicating a correspondence relationship between pixels in the first image 2 and pixels in the second image 3 may be held by the specifying unit 105x (parameter holding unit 104).

The second image 3 to be generated may include, as next pixels, pixels having pixel values specified from pixel values of the pixels included in the first image 2. The pixels are pixels associated with the pixels in the first image 2 as described above, by the correspondence relationship indicated by the held data.

Note that the pixel values specified from the pixel values of the pixels included in the first image 2 may be the same pixel values as the pixel values of the first image 2 as described above, or may be an average pixel value of the above-described pixel values of the pixels included in the first image 2 and pixel values of pixels neighboring the pixels.

With this, the second image 3 may be generated by converting the direction 4bd of the person 100h in the first image portion 4bI in the first image 2 to the direction 5bd of the person 100h in the second image portion 5bI in the second image 3.

Note that the data 101d indicating the angle 201 may be obtained by the obtaining unit 100g in the image conversion processing unit 100.

This obtainment, for example, may be performed when the angle 201 at which the imaging apparatus 101 is installed is changed, to the angle 201b, from the one angle 201a that is the angle other than the other angle 201b, or may be performed when installing the imaging apparatus 101.

When the indicated angle 201 is the one angle 201a, the processing described earlier may be performed based on the intersection 801 in the imaging plane 807 for installing the imaging apparatus 101 to be oriented downward at the one angle 201a.

When the angle 201 is the other angle 201b, the processing described earlier may be performed with reference to the intersection 801 in the imaging plane 807 for installing the imaging apparatus 101 downward at the other angle 201b.

With this, in both cases of installation at the one angle 201a and the installation at the other angle 201b, an appropriate second image 3 is generated, thus reliably performing appropriate generation of the second image 3.

Note that the obtained data 101d may be, for example, the data input into the image conversion processing unit 100 by the user operating on the image conversion processing unit 100.

On the other hand, this data 101d may be obtained from the imaging apparatus 101.

For example, the imaging apparatus 101 may include a detecting unit 101s which detects an angle of depression of the imaging apparatus 101 such as a gyroscope.

The obtaining unit 100g may obtain the data 101d which indicates, as the angle 201 described above, the angle detected by this detecting unit 101s.

Note that, for example, when the data 101d is obtained, the data to be held may be updated with appropriate data when the angle at which the imaging apparatus 101 is placed is the angle 201 indicated by the obtained data 101d.

After this updating, as the processing described earlier, the processing based on the updated data may be performed.

With this, it is not necessary to obtain data 101d again after the updating above, thus allowing performing the processing relatively easily.

Note that each half line 803 is considered as follows.

Specifically, in the generated second image 3; each line 5bL (FIG. 10) has the same order (as described earlier) as the order of a corresponding half line 803.

The pixels in the line 5bL having the same order in the second image 3 are pixels specified from the pixels included in the half line 803 in the first image 2, such as the pixels in the half line 803.

Note that for example, the pixels of the line 5bL can be specified from the pixels in the half line 803. The latter a pixel in the half line 803 is located among the plurality of pixels in the half line 803 (in order of being further away from the point 801), the latter the pixel is located in the line 5bL to be specified from the pixel (in order of being on a more positive side in the direction 3y).

For example, accordingly, the generated second image 3 may include an image portion of the person (person 5a, 5b), in terms of the person (person 4a, 4b) included in any image portion of the first image 2 (image portion 4aI, 4bI).

This allows, in the second image 3, imaging any person and detecting any person successfully, thus allowing reliable performance of human detection.

In addition, the following operation may be performed.

Specifically, as described above, a first pixel 9b1 (pixel 9bn, 9bf) in FIG. 12 corresponds to each of the pixels in the line 803 passing through the point 801 (FIG. 10 and so on) in the first image 2.

In addition, there is a second pixel 9b2 in the line 803.

For example, a pixel in the second image 3 which is specified from the second pixel 9b2 is adjacent to a pixel in the second image 3 which is specified from the first pixel 9b1, from the top-bottom direction 3y of the second image 3.

There is a first interval 1201 between the first pixel 9b1 and the second pixel 9b2.

As shown in FIG. 12, for example, the interval 1201 at the first pixel 9b1 that is a pixel 9bf located relatively far from the point 801 may be wider than the interval 1201 at the first pixel 9b1 that is a pixel 9bn located relatively close.

This allows generating, as the second image 3, a second image 3 (see the second image 3q in FIG. 12) that is more appropriate than a second image 3 (see the second image 3p in FIG. 11) generated when the interval 1201 is not wider, thus allowing generating the second image 3 more appropriately.

On the other hand, there is also a third pixel 9b3 in another line 803 that is other than the line 803 including the first pixel 9b1 (pixels 9bn, 9bf) as described above.

For example, a pixel in the second image 3 which is specified from this third pixel 9b3 is adjacent to the pixel specified from the first pixel 9b1 as described above, from the left-right direction 3x of the second image 3.

An interval 1202 is provided between the first pixel 9b1 and this third pixel 9b3.

The interval 1202 at the pixel 9b1 (pixel 9bf) located farther is wider than the interval 1202 at the first pixel 9b1 (pixel 9bn) located closer (see FIG. 12).

A ratio between the intervals 1201 and 1202 in the first pixel 9b1 that is farther (pixel 9bf) may be the same as the ratio between the intervals 1201 and 1202 at the first pixel 9b1 that is closer (pixel 9bn).

Note that this ratio, for example, is a ratio of "1:1" as shown in two symbol "Δr"s shown in FIG. 12.

In other words, the interval 1201 at each first pixel 9b1 (closer pixel 9bn, farther pixel 9bf) may be the same as the interval 1202 at the first pixel 9b1.

With this, the interval 1201 at the first pixel 9b1 that is farther (pixel 9bf) may be wider than the interval 1201 at the first pixel 9b1 that is closer (pixel 9bn).

Note that, for example, the specifying unit 105x may specify a pixel in the first image 2 which corresponds to the pixel in the second image 3 (see the corresponding point calculating unit 105).

The specifying unit 105x may specify the pixel value of the pixel in the second image 3 from the pixel value of a pixel included in the first image 2 and corresponding to the pixel in the second image 3.

Note that two or more pixels may be specified as the pixels in the first image 2 which correspond to the pixel in the second image 3, and the pixel values of the pixels in the second image 3 may be specified from the pixel values of the two or more pixels.

Note that for example, the specifying unit 105x may hold the data indicating first coordinates on the imaging plane 807, a normal vector of the imaging plane 807, second coordinates of the imaging apparatus 101, and an optical axis direction 804L of the imaging apparatus 101 (see the parameter holding unit 104).

The point 801 may be specified as a position of the intersection between a plane of the indicated normal vector passing through a point of the indicated first coordinates and a line (straight line) passing through the indicated second coordinates and having the indicated direction 804L.

Note that this specifying may be performed by calculating a formula for determination of this kind in a mathematical area.

Note that the point 801 thus specified may be located at one position when the indicated direction 804L is one direction that is the direction when the angle of depression 201 is one angle 201a, and may be located at the other position when the indicated direction 804L is the other direction in the case where the angle of depression 201 is the other angle 201b.

As the direction 803L, when one position is specified as the point 801, one direction 803La of one line 803 passing through the one position may be specified, and another direction 803Lb of another line 803 passing through another position may be specified when the other position is specified.

This allows avoiding the direction 9xd passing through a center position 9x of the first image 2 from being specified, and specifying a direction other than the direction 4bd in which an image of the upward direction of the vertical direction z of the space 101r in which the person 100h is present is captured, thus avoiding an inappropriate direction from being specified.

In other words, the direction 803La (the one direction 803La or the other direction 803Lb) of the line 803 (the one line or the other line) passing through the point 801 below in the vertical direction of the imaging apparatus 101 is specified, so that the appropriate direction is specified.

With this, assuming that a person 100h is located relatively far from the imaging apparatus 101, such as a leftmost person 100h among the three people 100h in FIG. 2, an appropriate operation is performed despite the direction 804L of the optical axis being directed diagonally downward with respect to the horizontal direction x at the angle of depression 201 instead of being directed downward in the vertical direction z. In other words, the operation allows preventing the inappropriate direction 9xd from being specified, and specifying the appropriate direction 4bd (the one direction 803La or the other direction 803Lb).

This leads to generating the second image 3 including an appropriate second image portion 5bI based on the specified direction, and the second image portion 5bI is detected from this second image 3. This prevents complexity of the configuration of the detector (human detector 100d) which detects, from the image (second image 3), an image portion (the second image portion 5bI) including an image of the person 100h.

This prevents a complicated configuration despite the optical axis direction 804L being diagonally downward, and allows simplifying the configuration.

Moreover, as described above, the following operation is performed although not only the one angle 201a but also the other angle 201b can be the angle 201 when the direction 804L of the optical axis is directed diagonally downward.

The operation not only specifies the appropriate direction by specifying the one direction 803La as the direction 803L when the angle 201 is the one angle 201a.

In other words, the appropriate direction is also specified when the angle 201 is the other angle 201b, by specifying the other direction 803Lb as the direction 803L.

This allows specifying the appropriate direction relatively reliably.

Thus, a plurality of configurations (the image extension processing unit 103 and so on) are combined, and such combination produces a synergetic effect. In contrast, the known prior art is missing part or all of these configurations, so that no synergetic effect is produced. In this respect, the technique according to the present invention is different from the prior art.

Note that the present invention can be realized not only as an apparatus but also as: a method including, as steps, processing units included in the apparatus; a program for causing a computer to execute these steps; a computer-readable recording medium such as a compact disc read only memory (CD-ROM) on which the program is recorded; information indicating the program; data or a signal. Moreover, such program, information, data, and signal may be distributed via a communication network such as the Internet.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

In an output image (extended image 3 in FIG. 10), tilts of objects standing upright with respect to a ground are unified, so that object detection, particularly human detection, requires only one feature quantity.

It is possible to improve convenience of a system 100s including an imaging apparatus 101 and an image conversion processing unit 100.

It is possible to prevent a complicated configuration despite a direction 804L of an optical axis being directed diagonally downward, to simplify the configuration.

What is claimed is:

1. An image generating apparatus which generates a second image that is an image converted from a first image captured by an imaging apparatus placed to be oriented downward at an angle of depression with respect to a horizontal direction, said image generating apparatus comprising:
a specifying unit configured to specify a straight line included in the first image and passing through an intersection between an imaging plane and a vertical vector having a start point at the imaging apparatus; and
an image extension processing unit configured to generate the second image by sampling pixels of the first image along the specified straight line,
wherein said specifying unit is configured to specify the pixels included in the specified straight line, the generated second image includes the sampled and specified pixels as pixels included in a straight line in a top-bottom direction of the second image, the specified straight line is a straight line passing through a first intersection that is the intersection and a second intersection, and the second intersection is an intersection between the imaging plane and a third vector generated by rotating a second vector around a first vector as a rotational axis, the first vector being the vertical vector, and the second vector having a start point at the imaging apparatus.

2. The image generating apparatus according to claim 1, wherein the first image includes a pixel that is located at the second intersection with the third vector generated by rotating the second vector at each of different angles, and the second image includes, as pixels in a straight line in a left-right direction of the second image, a plurality of pixels including the pixel that is located at the second intersection at each of the different angles and is included in the first image.

3. The image generating apparatus according to claim 2, wherein said specifying unit is configured to generate the third vector at each of the different angles and calculate the second intersection in the generated third vector.

4. The image generating apparatus according to claim 3, comprising an obtaining unit configured to obtain data indicating the angle of depression, wherein the second intersection calculated at each of the different angles is an intersection with the imaging plane at the angle of depression indicated by the obtained data.

5. The image generating apparatus according to claim 4, wherein the angle of depression indicated by the obtained data is an angle detected by a gyroscope included in the imaging apparatus.

6. The image generating apparatus according to claim 1, comprising a detecting unit configured to detect a position of an image portion of a person as a location of the person, the image portion being included in the straight line in the top-bottom direction of the second image.

7. The image generating apparatus according to claim 1, wherein the first image is captured by the imaging apparatus using a wide-angle lens included in the imaging apparatus.

8. The image generating apparatus according to claim 1, wherein the first image is captured by the imaging apparatus using a fisheye lens included in the imaging apparatus, said image generating apparatus comprises an image distortion correcting unit configured to correct the first image before correction which includes a distortion derived from the fisheye lens to the first image after the correction which does not include the distortion, and the second image is not generated from the first image before the correction, but is generated from the first image after the correction.

9. The image generating apparatus according to claim 1, wherein the specified straight line includes a first pixel and a second pixel, the generated second image includes one pixel which is specified from the first pixel and another pixel which is adjacent to the one pixel and is specified from the second pixel, and the more distant the first pixel is from the intersection of the vertical vector, the wider an interval between the first pixel and the second pixel is.

10. The image generating apparatus according to claim 9, wherein the second image includes a pixel specified from a third pixel which is adjacent to the one pixel from a right-left direction of the second image and is included in the first image, and the interval is a first interval that is different from a second interval which is an interval between the first pixel and the third pixel, and a ratio of the first interval with respect to the second interval at the first pixel located relatively distant from the intersection of the vertical vector is equal to a ratio of the first interval with respect to the second interval at the first pixel located relatively close to the intersection.

11. The image generating apparatus according to claim 1, wherein the captured first image includes an image portion including an image of a person, a direction from a foot to a head of the person in the captured first image is a different direction from a top-bottom direction of the first image, the different direction coincides with a direction of the straight line passing through the intersection between the imaging plane and the vertical vector and through a position of the image portion, said specifying unit is configured to specify the straight line passing through the intersection, so as to specify a direction of the specified straight line as the direction of the person, the generated second image includes an image portion including an image of the same person as the person in the captured first image, and the included image portion is an image portion generated by converting the specified direction in the image portion included in the first image to a top-bottom direction of the second image.

12. An image generating method for generating a second image that is an image converted from a first image captured by an imaging apparatus placed to be oriented downward at an angle of depression with respect to a horizontal direction, said image generating method comprising:

specifying a straight line included in the first image and passing through an intersection between an imaging plane and a vertical vector having a start point at the imaging apparatus; and generating the second image by sampling pixels of the first image along the specified straight line, wherein said specifying includes specifying the pixels included in the specified straight line, the generated second image includes the sampled and specified pixels as pixels included in a straight line in a top-bottom direction of the second image, the specified straight line is a straight line passing through a first intersection that is the intersection and a second intersection, and the second intersection is an intersection between the imaging plane and a third vector generated by rotating a second vector around a first vector as a rotational axis, the first vector being the vertical vector, and the second vector having a start point at the imaging apparatus.

13. A non-transitory computer-readable recording medium which holds a program for generating a second image that is an image converted from a first image captured by an imaging apparatus placed to be oriented downward at an angle of depression with respect to a horizontal direction, the program causing a computer to execute:

specifying a straight line included in the first image and passing through an intersection between an imaging plane and a vertical vector having a start point at the imaging apparatus; and generating the second image by sampling pixels of the first image along the specified straight line, wherein said specifying includes specifying the pixels included in the specified straight line, the generated second image includes the sampled and specified pixels as pixels included in a straight line in a top-bottom direction of the second image, the specified straight line is a straight line passing through a first intersection that is the intersection and a second intersection, and the second intersection is an intersection between the imaging plane and a third vector generated by rotating a second vector around a first vector as a rotational axis, the first vector being the vertical vector, and the second vector having a start point at the imaging apparatus.

* * * * *